US007756017B2

(12) United States Patent
Goyal et al.

(10) Patent No.: US 7,756,017 B2
(45) Date of Patent: Jul. 13, 2010

(54) SYSTEM AND METHOD FOR SCHEDULING ROUTING TABLE CALCULATION IN LINK STATE ROUTING PROTOCOLS

(75) Inventors: Mukul Goyal, Milwaukee, WI (US); Seyed H. Hosseini, Mequon, WI (US)

(73) Assignee: The UWM Research Foundation, Inc., Milwaukee, WI (US)

( * ) Notice: Subject to any disclaimer, the term of this patent is extended or adjusted under 35 U.S.C. 154(b) by 268 days.

(21) Appl. No.: 11/852,025

(22) Filed: Sep. 7, 2007

(65) Prior Publication Data
US 2008/0062862 A1 Mar. 13, 2008

Related U.S. Application Data

(60) Provisional application No. 60/843,190, filed on Sep. 8, 2006.

(51) Int. Cl.
*G06F 11/00* (2006.01)
(52) U.S. Cl. .................. 370/225; 370/237; 370/252; 709/239; 709/242
(58) Field of Classification Search ............ None
See application file for complete search history.

(56) References Cited

U.S. PATENT DOCUMENTS

| 6,775,709 B1* | 8/2004 | Elliott .................... 709/238 |
| 7,362,709 B1* | 4/2008 | Hui et al. ................ 370/237 |
| 2004/0042396 A1* | 3/2004 | Brown et al. ............ 370/227 |
| 2006/0187916 A1* | 8/2006 | Vasseur et al. .......... 370/389 |
| 2006/0291391 A1* | 12/2006 | Vasseur et al. .......... 370/235 |

OTHER PUBLICATIONS

"Self balancing binary search tree," http://en.wikipedia.org/wiki/self-balancing_binary_search_tree (Nov. 26, 2007) 4 pages.
Adjih, C. et al., "On the robustness and stability of connected dominating sets," Tech. Rep. Research Report No. 5609, INRIA (Sep. 1997) 26 pages.
Alaettinoglu, C. et al., "Towards millisecond IGP convergence," NANOG 20, (Oct. 24, 2000) 23 pages.
Basu, A. et al., "Stability issues in OSPF routing," Computer Commun. Rev. (2001) 31(4):225-236.
Chandra, M., "Extensions to OSPF to support mobile ad hoc networking," Internet-draft, draft-chandra-ospf-manet-ext-03.txt (Apr. 2005) 1-32.
Choudhury, G., "Prioritized treatment of specific ospf version 2 packets and congestion avoidance," Request for Comments (Best Current Practice) RFC 4222, Internet Engineering Task Force (Oct. 2005) 15 pages.

(Continued)

*Primary Examiner*—Chi H. Pham
*Assistant Examiner*—Shick Hom
(74) *Attorney, Agent, or Firm*—Michael Best & Friedrich LLP

(57) ABSTRACT

A method, and a system, called link state advertisement ("LSA") correlation, for scheduling routing table updates following a topology change. LSA correlation correlates information in the LSAs to identify the topology change that led to their generation. A routing table update is performed when a topology change has been identified.

16 Claims, 24 Drawing Sheets

OTHER PUBLICATIONS

CISCO Systems, Inc., "IS-IS fast-flooding of LSPs using the fast-flood command," http://www.cisco.com/en/US/products/ps6350/products_configuration_guide_chapter09186a0080455693.html (2004) 1-6.

CISCO Systems, Inc., "IS-IS support for priority-driven IP prefix RIB installation," http://www.cisco.com/en/US/products/sw/iosswrel/ps1829/products_feature_guide09186a00801b2285.html (2005-2006) 1-16.

CISCO Systems, Inc., "OSPF incremental SPF," http://www.cisco.com/en/US/products/ps6350/products_configuration_guide_chapter 09186a00804556a5.html (2003) 1-6.

CISCO Systems, Inc., "OSPF link-state advertisement (LSA) throttling," http://www.cisco.com/en/US/products/sw/iosswrel/ps1829/products_feature_guide09186a0080161064.html (Jul. 28, 2003) 1-20.

CISCO Systems, Inc., "OSPF shortest path first throttling," http://www.cisco.com/en/US/products/sw/iosswrel/ps1838/products_feature_guide09186a0080134ad8.html, CISCO IOS Release 12.2(14)S, 12.0(23)S, and 12.2(15)T (Apr. 15, 2005) 1-10.

CISCO Systems, Inc., "OSPF update packet-pacing configurable timers," http://www.cisco.com/en/US/products/ps6350/products_configuration_guide_chapter09186a00804556e8.html, CISCO IOS Release 12.2(4)T3 (Oct. 30, 2003) 1-16.

Clausen, T. et al., "Optimized link state routing protocol (OLSR)," Request for Comments (Experimental) RFC 3626, Internet Engineering Task Force (Oct. 2003) 1-73.

Dijkstra, E.W., "A note on two problems in connexion with graphs," Numerische Mathematik (1959) 1:269-271.

Francois, P. et al., "Achieving sub-second IGP convergence in large IP networks," Computer Commun. Rev. (Jul. 2005) 35(3): 35-44.

Goyal, M. et al., "A distributed OSPFD simulator," http://www.cs.uwm.edu/~mukul/newospfd.html (Dec. 3, 2006) 1 page.

Katz, D. et al., "Bidirectional forwarding detection," Internet-draft, draft-ietf-bfd-base-05.txt (Jun. 2006) 1-40.

Katz, D., "Why are we scared of SPF? IGP scaling and stability," NANOG 25, (Oct. 2002) 1-22.

Markopoulou, A. et al., "Characterization of failures in an IP backbone," Proceedings of INFOCOM 2004, Hong Kong, Mar. 7-11, 2004 11 pages.

McQuillan, J.M. et al., "An overview of the new routing algorithm for the arpanet," Proceedings of the Sixth Data Communications Symposium, Alisomar Conference Grounds, Pacific Grove, California, ACM Press (1979) 63-68.

Moy, J., "OSPF version 2," Request for Comments (Standards Track) RFC 2328, Internet Engineering Task Force (Apr. 1998) 1-244.

Ogier, R. et al., "Manet extension of ospf using cds flooding," Internet-draft, draft-ogier-manet-ospf-extension-08.txt (Oct. 2006) 1-53.

Oran, D., "OSI IS-IS intra-domain routing protocol" Request for Comments RFC 1142, Internet Engineering Task Force (Feb. 1990) 1-157.

Roy, A., "Adjacency reduction in OSPF using SPT reachability," Internet-draft, draft-roy-ospf-smart-peering-01.txt (Nov. 23, 2005) 1-17.

Shaikh, A. et al., "An OSPF topology server. Design and evaluation," IEEE Journal on Selected Areas in Communications (May 2002) 20(4):746-755.

Shaikh, A. et al., "Experience in black-box ospf measurement," Proceedings of the First ACM SIGCOMM Workshop on Internet Measurement: IMW 2001: Alliance Francaise, San Francisco, California, Nov. 1-2, 2001, ACM Press (2001) 113-125.

Strand, J. et al., "Issues for routing in the optical layer," IEEE Communication Magazine (2001) 39:81-87.

\* cited by examiner

| Link Type | Link States in an LSA |
|---|---|
| Point-to-point link | one type 3 link state |
| | one type 1 link state (after adj establishment) |
| Broadcast/NBMA link | one type 3 link state (before adj establishment) |
| | one type 2 link state (after adj establishment) |
| Point-to-multipoint link | one type 3 link state |
| | multiple type 1 link states (after adj establishment) |
| Virtual link | one type 4 link state | processNewLSA(i): //process new LSA originated by node i
1: Initialize the *scheduleSPF* flag to false.
2: If the received LSA is a max age LSA, reset *nodeStatus[i]*, mark node i's adjacencies and associated stubs as down and return.
3: A new LSA is received from node i. Hence, it can not be in the process of going down. Clear the *nodeDownActive[i]* entry if it is set. Also, set *scheduleSPF* to true if *doSPF* variable is true. This will allow any unprocessed adjacency breakdowns with node i to be assimilated in the routing table immediately.
4: Iterate through the new LSA to update the number of neighbors (*numNbrs[i]*) for node i.
5: If node i is currently down (i.e. *nodeStatus[i]* is false), include it in *pendingNodes* list.
6: Iterate through the link states described in the new LSA. If a link state describes a new stub (type 3) link, set *stubStatus[j]* and *doSPF* to true. If a link state describes a cost change for an existing adjacency, update the link cost and set *scheduleSPF* to true. If a link state describes a new adjacency (i.e. *adjStatus[i][j]* is currently false), call *processUpSubEvent()* procedure.
7: If node i was up (i.e. *nodeStatus[i]* was true) before the receipt of this LSA, iterate through the *old* instance of its LSA and identify the adjacencies and stub links that no longer exist. For each down stub link, reset the corresponding *stubStatus* entry to false and set the *doSPF* variable to true. For each down adjacency, call *processDownSubEvent()* procedure.
8: If this LSA is received during database exchange with a neighbor, clear the *scheduleSPF* flag.

processUpSubEvent(i,j,newCost): //node i establishes adjacency with node j
1: Set *adjStatus[i][j]* to true and update the link cost.
2: If node j is already adjacent to node i, increment the number of bidirectional adjacencies associated with nodes i and j. Set *doSPF* to true since this bidirectional adjacency is not yet assimilated into the routing table.
3: If both nodes i and j are already up and node j is already adjacent with node i then declare link (i,j) to be up and set the *scheduleSPF* flag to true.
4: If node i is currently marked as down but has established adjacency with all its neighbors then declare node i to be up, set *nodeStatus[i]* to true and set the *scheduleSPF* flag. Additionally, remove node i from *pendingNodes* list.
5: Repeat the previous step for node j.
6: If *scheduleSPF* flag is true but *pendingNodes* list is not empty, clear the *scheduleSPF* flag and start the *pendingNodesTimer*. On the firing of this timer, an routing table update will be performed if *pendingNodes* list is still not empty.

processDownSubEvent(i,j): //node i breaks adjacency with node j
1: Set *adjStatus[i][j]* to false.
2: If node j is not adjacent to node i, return.
3: Decrement the bidirectional adjacencies associated with nodes i and j.
4: If *nodeDownActive[j]* is false, node i is the first node in recent past to break adjacency with node j. Declare link (i,j) to be down and set *scheduleSPF* and *nodeDownActive[j]* to true. If *nodeDownActive[j]* is already true, just set *doSPF* flag to true since the breakdown of node i's adjacency with node j is probably a result of node j going down.
5: If the number of bidirectional adjacencies of node j has reduced to 0, declare node j to be down, set *nodeStatus[j]* and *nodeDownActive[j]* to false and make *scheduleSPF* true. Additionally, iterate through node j's LSA and mark all its adjacencies and stubs as down.

*FIG. 4*

SYSTEM AND METHOD FOR SCHEDULING ROUTING TABLE CALCULATION IN LINK STATE ROUTING PROTOCOLS

RELATED APPLICATION

This application claims priority to U.S. Provisional Patent Application Ser. No. 60/843,190, filed on Sep. 8, 2006, the entire contents of which are incorporated herein by reference.

STATEMENT REGARDING FEDERALLY SPONSORED RESEARCH OR DEVELOPMENT

This invention was made with United States government support under the National Science Foundation ("NSF") awarded by grant number ECS 0520064. The United States government has certain rights in this invention.

BACKGROUND AND SUMMARY

The invention relates to computer networks, and particularly, to link state routing protocols used in computer networks.

Link state routing protocols such as open-shortest-path-first ("OSPF") and intermediate-system-to-intermediate-system ("IS-IS"), using a shortest path first ("SPF") routing, are commonly used interior gateway protocols ("IGP") on the Internet. An IGP generally provides functionalities of the routing within an autonomous system ("AS"). A link state routing protocol typically divides an AS into multiple areas.

A router in an AS generally knows an operating topology of its area(s) and a cost to reach destinations outside its area(s) via area border routers. The router uses this information to determine the least cost (shortest) paths to different destinations. A design philosophy behind some currently deployed IGPs is to limit processing/bandwidth requirements of the protocol. Stability and robustness are prime concerns and the time the protocol takes to adjust to a change in the network topology (speed of convergence) is of secondary importance. Thus, when there is a change in the topology of the network (either a failure of a device or an addition of a new device to the topology), these protocols take an amount of transient time to converge to a new topology. During this transient time, network service may suffer serious deterioration in quality or may breakdown completely. Given the advent of new real-time applications over the Internet (e.g. voice over IP), a service deterioration/breakdown extending several tens of seconds can be considered intolerable.

A convergence to a topology change in the OSPF protocol includes the following steps: 1) detection of a topology change by the routers in the vicinity followed by the generation of new link state advertisements ("LSAs") in response; 2) flooding of the new LSAs throughout the area network; and 3) routing table calculations by each router on receiving the LSAs, followed by distributing the routing table updates to the line cards.

In OSPF, the establishment and breakdown of an adjacency between two neighbor routers takes place via the Hello protocol. The Hello protocol requires a router to send Hello messages down its interfaces after every HelloInterval duration. After exchanging Hello messages, two neighbor routers synchronize their link state databases ("LSDBs") before declaring adjacency to each other by originating new instances of their LSAs. Once established, an adjacency is maintained by periodic exchange of the Hello messages, and the LSDBs of the two routers stay synchronized via LSA flooding. The breakdown of an adjacency following a link or router failure is detected when a router does not receive a Hello message from its neighbor within a RouterDeadInterval. With the default values of a HelloInterval and the RouterDeadInterval (for example, 10 and 40 seconds respectively), the detection of a failure can take anywhere between 30 to 40 seconds. The affected routers declare breakdown of an adjacency by generating new instances of their LSAs. These newly generated LSAs are flooded throughout the OSPF area to which the failed adjacency belonged. Process of LSA generation and flooding can potentially be affected by minLSInterval, minLSAArrival, and/or RxmtInterval parameters defined in the OSPF standard as well as various non-standard LSA pacing delays. The minLSInterval and minLSAArrival parameters limit a frequency with which a router can originate new LSAs and accept new LSAs originated by others. The RxmtInterval determines a retransmission interval for a lost LSA. The LSA pacing delays, with a purpose to limit a link bandwidth consumption by LSA flooding, retransmission, or refresh process, introduce time gaps between consecutive LSUpdate packets (containing a plurality of LSAs) sent down an interface.

Recently, attention has been devoted to optimize the process of failure detection, adjacency establishment, LSA generation and flooding in link state routing protocols. For example, common link layers, such as packet over SDH or SONET ("POS"), can intimate a link failure to the router in few tens of milliseconds. For link layers with no such capability, bidirectional forwarding detection ("BFD") provides a protocol and media independent method to achieve sub-second failure detection. Another way to reduce the failure detection time is to use a combination of reduced HelloInterval, and prioritized Hello messages.

For another example, rather than using a fixed value, commercial routers allow dynamic determination of minLSInterval value within a configurable range. To counter the impact of pacing delays on the convergence process, there have been proposals to push "important" LSAs out of an interface without incurring pacing delays and to use an adaptive retransmission scheme rather than a fixed LSA retransmission interval of 5 seconds. For yet another example, research done in the context of extending OSPF protocol for use in mobile adhoc networks (MANETs) have resulted in several competing technologies to reduce the need for adjacency establishment between neighbor routers, optimize the LSA flooding process and controlling the level of topology information flooded through the network.

On receiving a new LSA, a router has to update its routing table. The amount of work done in this process depends on the type of LSA received. As per OSPF standard, on receiving new router or network LSAs, the routing table is built again from scratch. This process involves calculating:

1) a plurality of intra-area routes for all OSPF areas to which the router belongs (typically using Dijkstra's shortest path algorithm on the contents of router and network LSAs),
2) the inter-area routes by examining the contents of all summary LSAs, and
3) the AS-external routes by examining the contents of all AS-external ("ASE") LSAs.

Typically, a router may have up to a few hundred router or network LSAs and up to a few thousand summary or ASE LSAs in its LSDB. Calculating intra-area routes using Dijkstra's algorithm (with a time complexity $O(n \times \log(n))$) typically takes only a few tens of milliseconds on modern routers. This time can be further reduced by using incremental algorithms rather than Dijkstra's algorithm. However, the examination of potentially several thousand summary or ASE LSAs may take several hundred milliseconds. Some commercial IS-IS implementations support a priority based scheme to process IP prefixes advertised by the IS-IS protocol. Under this scheme, the paths to the advertised prefixes are updated (and installed on the line cards) in order of their configured high, medium, or low priorities. OSPF may also benefit from a similar scheme to process important ASE LSAs before others.

A typical topology change, such as a failure of a router, may cause generation of several new LSAs (one for each router with which the failed router had an adjacency). These LSAs may not arrive simultaneously on a given router. If a router were to perform a routing table update immediately on receiving a new LSA, it may end up doing several such updates in close succession. As discussed earlier, a complete routing table update may take upto a few hundred milliseconds on modern router processors. Thus, several routing table updates in close succession may keep the router processor busy for a long time and cause failure to perform other important tasks such as timely generation and processing of Hello messages. It is possible that such failures may snowball into a complete meltdown of routing functionality. Hence, commercial routers typically do not perform a routing table update immediately on receiving a new LSA. For example, Cisco routers, with older internetworking operating system ("IOS") releases, use a fixed value parameter spfHoldTime to limit the frequency of routing table updates to once per about 10 seconds. Additionally, there used to be an spfDelay (about 5 seconds) in doing a routing table update after receiving a new LSA. The spfDelay allows all the LSAs generated as a result of the topology change to arrive at the router before the routing table update.

In the following discussion, the above-identified scheme is referred to as fixed hold time scheme. While fixed spfDelay and spfHoldTime parameters limit the number of routing table updates and hence help avoid routing instability, they also slow down the router's convergence to the new topology. With their default values (5 seconds for spfDelay and 10 seconds for spfHoldTime), a router may take anywhere between 5 to 15 seconds to converge to a topology change after receiving a new LSA. To balance the needs for fast convergence and routing stability, Cisco routers with post 12.2(14)S release IOS use a simple exponential backoff scheme to adjust the wait time between successive routing table updates. In this scheme, referred to as exponential backoff hold time (or exponential hold time) scheme in the following discussion, the wait time between successive routing table updates is initially set to a small value that increases exponentially with the frequency of received new LSAs. This scheme is described hereinafter.

Both fixed and exponential hold time schemes are effective in limiting the frequency of routing table updates in case of frequent (e.g. a flapping interface) and large scale (e.g. a network-wide router reboot and a shared risk link group ("SRLG") failure) topology changes. While an exponential hold time scheme may provide faster convergence to isolated topology changes than a fixed hold time scheme, it is difficult to configure the scheme's parameters to achieve good performance (quick convergence with one or two routing table updates) for all possible isolated topology change scenarios in a network. A reason behind the OSPF protocol's apparent difficulty in achieving fast convergence to topology changes with minimum number of routing table updates is that the protocol uses individual LSAs as the trigger for routing table updates.

A simple exponential backoff scheme 100 to adjust the wait time (henceforth called spfHoldTime) between successive routing table updates is shown in FIG. 1. As shown in FIG. 1, a router is configured with the initial and maximum values for the spfHoldTime and a small value for spfDelay (an initial delay between a receipt of a new LSA and a first routing table update). Initially, the router is in INIT state 105 and moves to FIRST LSA state 110 on receiving a first new LSA. A change to the FIRST LSA state 110 is accompanied by the starting of a spfDelay timer. Any LSAs received while the router is in the FIRST LSA state 110 do not induce any action on part of the router since all these LSAs are assumed to be generated as a result of the same topology change as the first LSA. Once spfDelay is over, the router moves to a SPF state 115, performs a routing table update, and starts a spfHoldTime timer. At this point, the spfHoldTime has a pre-configured small initial value. If the spfHoldTime duration expires without a receipt of any more new LSAs, the router returns to the INIT state 110 with spfHoldTime still maintaining its small initial value. However, if the router receives a new LSA while in the SPF state 115, it moves to a SPF HOLD state 120, and causes the spfHoldTime value to be doubled (up to a pre-configured maximum limit; shown to be 10 seconds in FIG. 1). Since the move to SPF HOLD state 120 means that the router has already doubled the spfHoldTime value once after the last routing table update, any additional new LSAs received in the SPF HOLD state 120 do not cause any action to be taken. Once the spfHoldTime timer expires, the router moves back to the SPF state 115, performs a routing table update and restarts the spfHoldTime timer with a new value of spfHoldTime. A fixed hold time scheme can look similar to FIG. 1 except that the value of spfHoldTime does not change.

With reasonably small initial values for spfDelay and spfHoldTime, the exponential hold time scheme as shown in FIG. 1 may achieve quick convergence to an isolated topology change, especially when compared to the convergence time with fixed but large spfDelay or spfHoldTime values, with a small number of routing table updates. In case of frequent topology changes, the spfHoldTime is expected to quickly reach its maximum value thereby limiting the routing table update frequency. However, there exist some scenarios where this scheme may not be able to prevent several routing table updates in quick succession. This may happen if new LSAs arrive in such a manner that no LSA is received during the small spfHoldTime duration after the first routing table update. In this case, the router returns to the INIT state 105 after a first routing table update without ever doubling the spfHoldTime. Thus, the routing table update frequency can be much higher than expected. Even if the spfHoldTime increases to its maximum value, a small quiet period (equal to the maximum spfHoldTime value) causes the router to move back to the INIT state 105. A next set of LSAs may cause many SPF calculations to take place in quick succession before the spfHoldTime reaches its maximum value again.

Hence, significant attention has been given in the recent past to achieve fast convergence to topology changes in popular IGPs such as OSPF and IS-IS. As explained in the following sections, the process of convergence to a topology change (in OSPF and IS-IS) includes several steps. Recent research efforts have focused on reducing a plurality of delays contributed by individual steps to the overall convergence process. Often, there is a tradeoff involved between reducing delays and increasing processing or bandwidth overhead. While fast convergence to topology changes has emerged as a key requirement for next generation IGPs, a need for low processing overhead (which directly impacts the stability and robustness of the protocol) continue to be as important as before.

The invention provides a convergence process, namely the scheduling of the routing table calculations to be performed on receiving new link state advertisements ("LSAs") originated by the routers directly affected by a topology change. Particularly, a new method, called LSA correlation, schedules routing table calculations in response to the LSAs received following a topology change. Significantly improved performance of the LSA correlation method (in terms of both convergence delay and processing overhead) is shown over existing methods. Although the OSPF protocol is used to describe LSA correlation and compare its performance with other methods, the proposed method and its performance evaluation results are relevant for other link state routing protocols as well.

LSA correlation is based on correlating a plurality of individual LSAs to identify topology changes that have caused their generation. The identification of a topology change triggers a routing table update. In the following, how to correlate the individual router and network LSAs to identify the topology changes is discussed. In this discussion, the term node refers to both a router and a transit network. The correlation process includes the following steps: identify an up, down or cost change subevent by iterating through the contents of the new LSA (and its old version); and correlate the subevents to identify a topology change. Every new router and network LSA needs to undergo this correlation task.

A link can be declared "down" as in link down if either end breaks adjacency with the other. A link can be declared "up" as in link up if both ends establish adjacency with each other. A node can be declared "down" as in router down if no node is currently adjacent to it. A node can be declared "up" as in router up if it establishes adjacency with all its known neighbors. A shared risk link group ("SRLG") can be declared "down" as SRLG down if none of the links in the SRLG is "up." A point-of-presence ("PoP"), which is basically a physical location where an internet service provider ("ISP") has a bunch of routers in a rack, can be declared "down" as PoP down if it has no "up" out-of-pop links.

Since all the links in an SRLG share the same risk of failure, they fail together if the corresponding failure takes place. A common example of an SRLG is an optical fiber that carries a bunch of IP links. A cut in this fiber would cause all the links riding on the fiber to fail. Also, a PoP failure is the failure of a group of routers and hence treat it differently than an SRLG failure, which is typically the failure of a group of links. The information about the membership of the links and routers in SRLGs and PoPs could be flooded in the network via special LSAs.

LSA correlation depends on knowing if a router, an SRLG, or a PoP is in the process of "going down." When a new LSA is received from a router, for example, router A, any "going down" marking is undone for router A and its PoP, and the number of "up" out-of-pop links of router A's PoP is updated. When an LSA from router A indicates the break down of its adjacency with a neighbor router B, and router B has not yet indicated the breakdown of this adjacency, LSA correlation checks if router B or its PoP (assuming that routers A and B belong to separate PoPs) or any of the SRLGs to which the link belongs is in the process of "going down." If not, LSA correlation considers this event as a link failure and immediately schedule a routing table calculation so as to recover quickly from the link failure. Otherwise, LSA correlation considers the adjacency breakdown as part of a node/SRLG/PoP failure and mark router B, its PoP and all the SRLGs to which the link belongs as in the process of "going down."

LSA correlation also (re)starts a timer, called doSPF. The purpose of doSPF timer is to incorporate all the pending LSAs into the routing table if topology changes cannot be identified within a certain time duration. The firing of this timer results in an immediate scheduling of routing table calculation and all the "going down" markings are undone. The number of "up" adjacencies of router B, "up" out-of-pop adjacencies of router B and its PoP, and "up" links in all the SRLGs to which link A:B belongs are decremented, and the router, the PoP, or an SRLG is declared to be down if the corresponding number reduces to zero. Declaration of a router, a SRLG, or a PoP failure is accompanied by immediate scheduling of a routing table calculation. In case of a PoP failure, all the routers in the PoP are marked as down.

When an LSA from router A indicates establishment of adjacency with router B, LSA correlation checks if router B already considers router A to be adjacent. If so, LSA correlation undoes any "going down" marking for the set of SRLGs to which link (A:B) belongs and increment the number of their "up" links. If any "going down" marking is undone for an SRLG, an immediate routing table calculation is scheduled. LSA correlation increments the number of adjacencies for routers A and B and start the doSPF timer unless it is already running. If both routers A and B are currently considered "up", LSA correlation declares link (A:B) as "up." Otherwise, LSA correlation considers this adjacency establishment as part of a router "up" event. If either of routers A or B is currently considered to be down, LSA correlation checks if it has established adjacency with all its neighbors and if so, declare the router to be "up." The number of neighbors for a router can be determined by examining the router's LSA. Table I as shown in FIG. 3 shows different types of OSPF links and the information contained in an LSA for each link type. As shown, max(type 3 link states, type 1/2/4 link states) gives the number of neighbors for the router originating the LSA. LSA correlation counts only bidirectional adjacencies in the test for router up event since, in OSPF, the routing table update uses only those links where bidirectional adjacency exists between the two ends. The doSPF timer takes care of the possibility that a newly up router may not establish adjacency with all its neighbors. The firing of this timer causes a routing table calculation, thereby assimilating all the new LSAs received so far.

To avoid multiple routing table updates when multiple node up events take place in quick succession (e.g. a network-wide router reboot), LSA correlation keeps track of the list of the nodes that are in the process of coming up (a node can be considered in processing of coming up if it originates a new LSA but has not established adjacency with all its neighbors). Thus, the receipt of a new LSA from a node that is in the process of "coming up" causes its node ID to be inserted into a pendingNodes list. When a node has established adjacency with all its neighbors (i.e. is declared up), its ID is removed from the pendingNodes list, and a routing table calculation is performed if the pendingNodes list is now empty. With this optimization, LSA correlation can avoid multiple routing table updates in the event of multiple concurrent node up events. For safety, a pendingNodesTimer is started every time a routing table update is postponed because of non-empty pendingNodes list. If the pendingNodes list is still not empty when the timer pendingNodesTimer fires, a routing table update is performed to assimilate all recent node up events into the routing table.

Another optimization is to avoid routing table updates while the router is establishing adjacency with a neighbor. The correlation of the LSAs received during the link state database exchange may cause identification of several "topology changes". Thus, without this optimization, a router may end up doing several routing table updates while establishing. LSA correlation can infer that a node is in the processing of coming up if it originates a new LSA but has not established adjacency with all its neighbors. adjacency with a neighbor. This optimization may keep the network topology discovered during the database exchange process from triggering routing table updates. Once the adjacency establishment process is over, the two newly adjacent routers can generate new LSAs, which when correlated cause a routing table update to take place.

Other aspects of the invention will become apparent by consideration of the detailed description and accompanying drawings.

BRIEF DESCRIPTION OF THE DRAWINGS

FIG. 4 is an exemplary LSA correlation pseudo-code.

FIGS. 5(a)-(l) are a plurality of plots showing impacts of different factors on the behavior of fixed or exponential hold time schemes.

DETAILED DESCRIPTION

Figure 1:
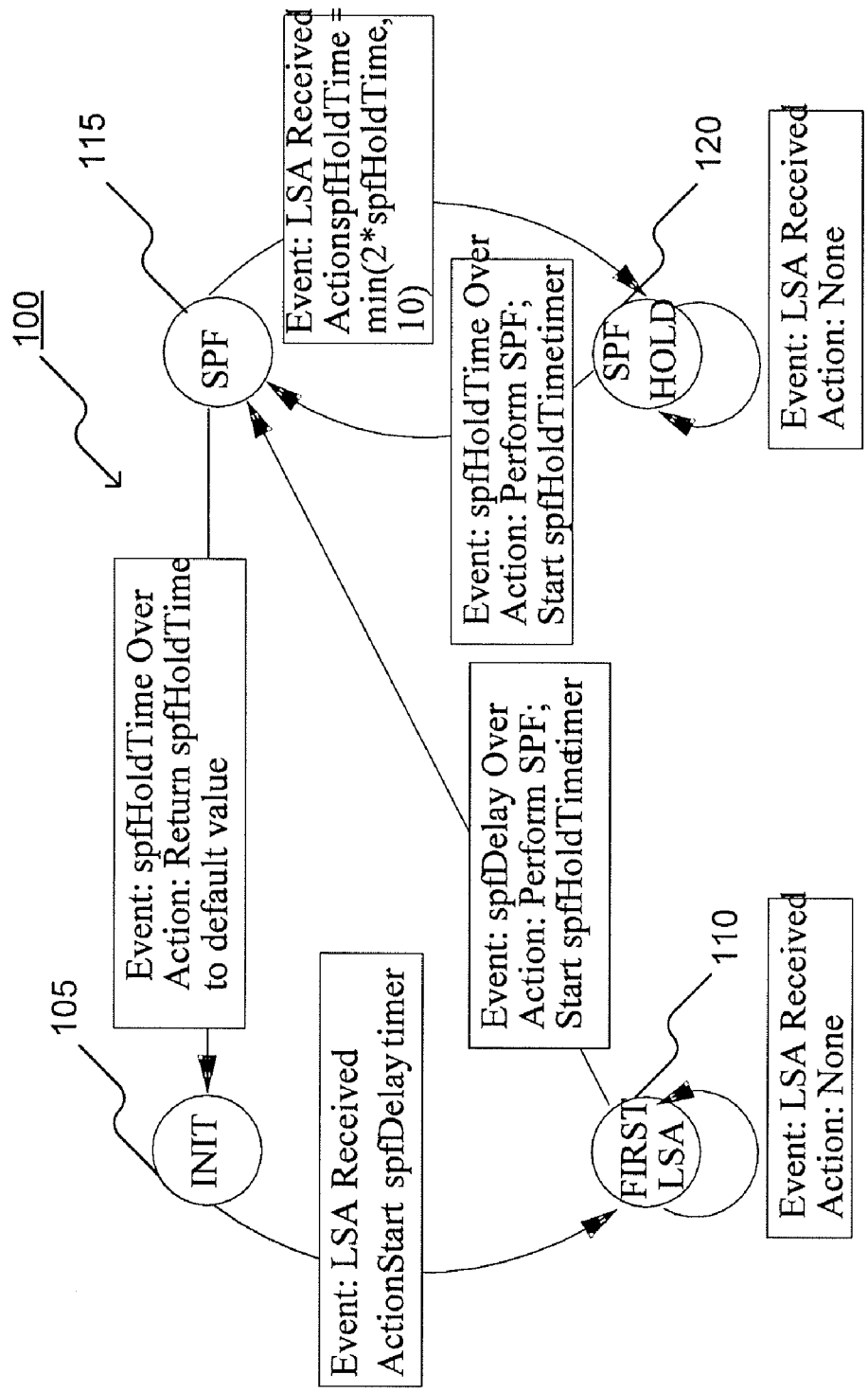
FIG. 1 is an exemplary "exponential backoff" scheme to adjust spfHoldTime.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples and drawings. However, no specific meaning is implied or should be inferred simply due to the use of capitalization. Thus, the claims should not be limited to the specific examples or terminology or to any specific hardware or software implementation or combination of software or hardware.

Fast convergence to topology changes is a key requirement for modern routing infrastructure while reducing the protocol CPU overhead continues to be as important as before. Modern commercial routers typically use a hold time based scheme to limit the number of routing table updates performed as new LSAs generated due to a topology change arrive at the router. The hold time based schemes, while limiting the number of routing table updates, also cause a significant delay in convergence to the topology change, which is clearly not acceptable any more. The invention thus provides a new approach, called LSA correlation, to schedule the routing table updates following a topology change. Rather than using individual LSAs as triggers for routing table updates, LSA correlation scheme correlates the information in the LSAs to identify the topology change that led to their generation. A routing table update is performed when a topology change has been identified. The LSA correlation scheme clearly performs much better than the hold time based schemes for isolated topology change scenarios. The performance of LSA correlation scheme and hold time based schemes under large scale topology change scenarios is also compared. Our simulation results suggest that LSA correlation scheme, with certain optimizations, performs quite well under large scale topology change scenario also.

Figure 2:
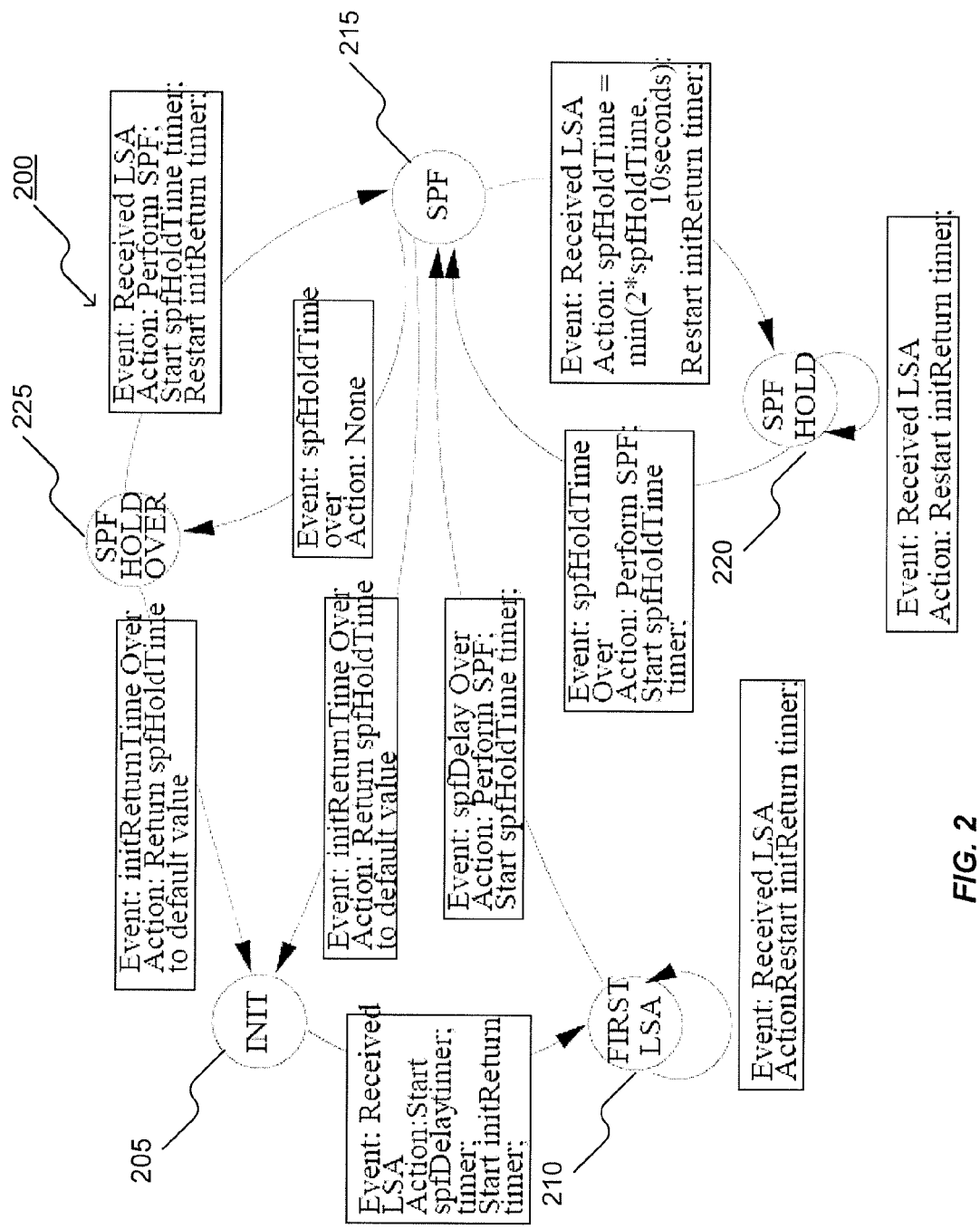
FIG. 2 is an exemplary initReturnTime based "exponential backoff" scheme to adjust spfHoldTime.

A modified exponential backoff hold time scheme 200 is depicted in FIG. 2. The modified scheme 200 uses an additional parameter—initReturnTime. The router returns to an INIT state 205 only when no new LSAs has been received for the initReturnTime duration. The initReturnTime is generally set to a large value (at least as large as the sum of the spfDelay and the maximum spfHoldTime). The modified scheme 200 differs from the original scheme 100 in the following respects: whenever a new LSA is received, the initReturn timer is restarted; and on the expiry of spfHoldTime while in the SPF state 215, the router moves to a SPF HOLD OVER state 225. The SPF HOLD OVER state 225 means that the last routing table update was done more than spfHoldTime duration ago. The receipt of a new LSA in the SPF HOLD OVER state 225 causes a new routing table update to be performed immediately and the router moves to the SPF state 215 without changing the spfHoldTime value.

The initReturn Time parameter prevents a return to the INIT state 205 when there is a brief lull in an arrival of new LSAs. However, there is still no guarantee that the spfHoldTime value may quickly ramp up to its maximum value in face of frequent topology changes. It is still possible that no LSA arrives while the router is in SPF state 215, thus the router moves to SPF HOLD OVER state 225 and soon receives an LSA causing it to perform a routing table update and move back to SPF state 215 with no increase in the spfHoldTime. A modified fixed hold time scheme, using the initReturnTime, may look similar to FIG. 2 except that the spfHoldTime stays fixed.

The values of configurable parameters (spfDelay, the initial and maximum spfHoldTime values) to be used in the above mentioned schemes depends on several factors such as the network topology, the characteristics of the deployed routers and the failure detection mechanisms etc. The spfDelay may be set to a small value (a few milliseconds) so that convergence to single link failures, the most common topology change category, is quick. The initial spfHoldTime value should be small but large enough to let all the LSAs resulting from an isolated topology change arrive at the router. This provides fast convergence to isolated topology changes with just two routing table updates. While determining a good initial spfHoldTime value, one has to consider different possible delays in the generation of all the new LSAs following a topology change. In case of a link/router failure, a neighbor router relying on the Hello protocol for failure detection might take any where between three to four Hello intervals to detect the failure. Hence, the time instants when different neighbors of a failed router detect the failure may differ by as much as one Hello interval. Similarly, when a router comes up, the adjacency establishment times with different neighbors may vary significantly. A router may not be able to generate a new LSA as soon as it has detected a topology change. Delays up to 0.5 seconds have been observed in the generation of a new LSA after an adjacency establishment on commercial routers.

Further, different LSAs may take different routes to arrive at a given router and therefore their arrival times may vary considerably. Thus, it is difficult to find an initial spfHold-Time value that is optimal in all the situations. Thus, there is a tradeoff between the speed of convergence and the number of routing table updates. A large initial value for spfHoldTime can delay the convergence time for some topology changes but allows the convergence to most of the isolated topology changes to take at most routing table updates and the spfHold-Time quickly to reach its maximum value in case of frequent topology changes. On the other hand, a small initial value for spfHoldTime may mean faster convergence for some topology changes at the expense of a few extra routing table updates. Similar dilemma exists in choosing a good maximum spfHoldTime value.

In the following, a new method to determine when to perform a routing table update following a topology change is discussed. This method, called LSA correlation, is generally based on correlating the individual LSAs resulting from a topology change to identify the topology change that caused their generation. The identification of a topology change triggers a routing table update. In the following, how to correlate the individual router and network LSAs to identify the topology change that caused their generation is discussed. In this discussion, the term node refers to both a router and a transit network. The correlation process includes the following steps: 1) identifying an up, down or cost change subevent by iterating through the contents of the new LSA (and its old version)—this step has O(k) time complexity, where k is the number of link states contained in the LSA; 2) correlating the subevents to identify a topology change. This step has O(l) time complexity for each subevent; and 3) post processing required following the identification of a topology change— the time complexity associated with this step depends on the type of the topology change and is discussed later.

Every new router and network LSA may need to undergo this correlation task. For most LSAs, the LSA correlation related processing can involve only the first two steps mentioned above with an overall time complexity O(k). Here, k corresponds to the number of neighbors (routers and networks) of the node originating the LSA, which is typically a small number. Note that the OSPF specification requires the new instance of an LSA to be compared to the old instance to determine if a routing table update is required. Hence, many OSPF implementations may already be doing most of the processing required for LSA correlation.

Figures 3, 3A:
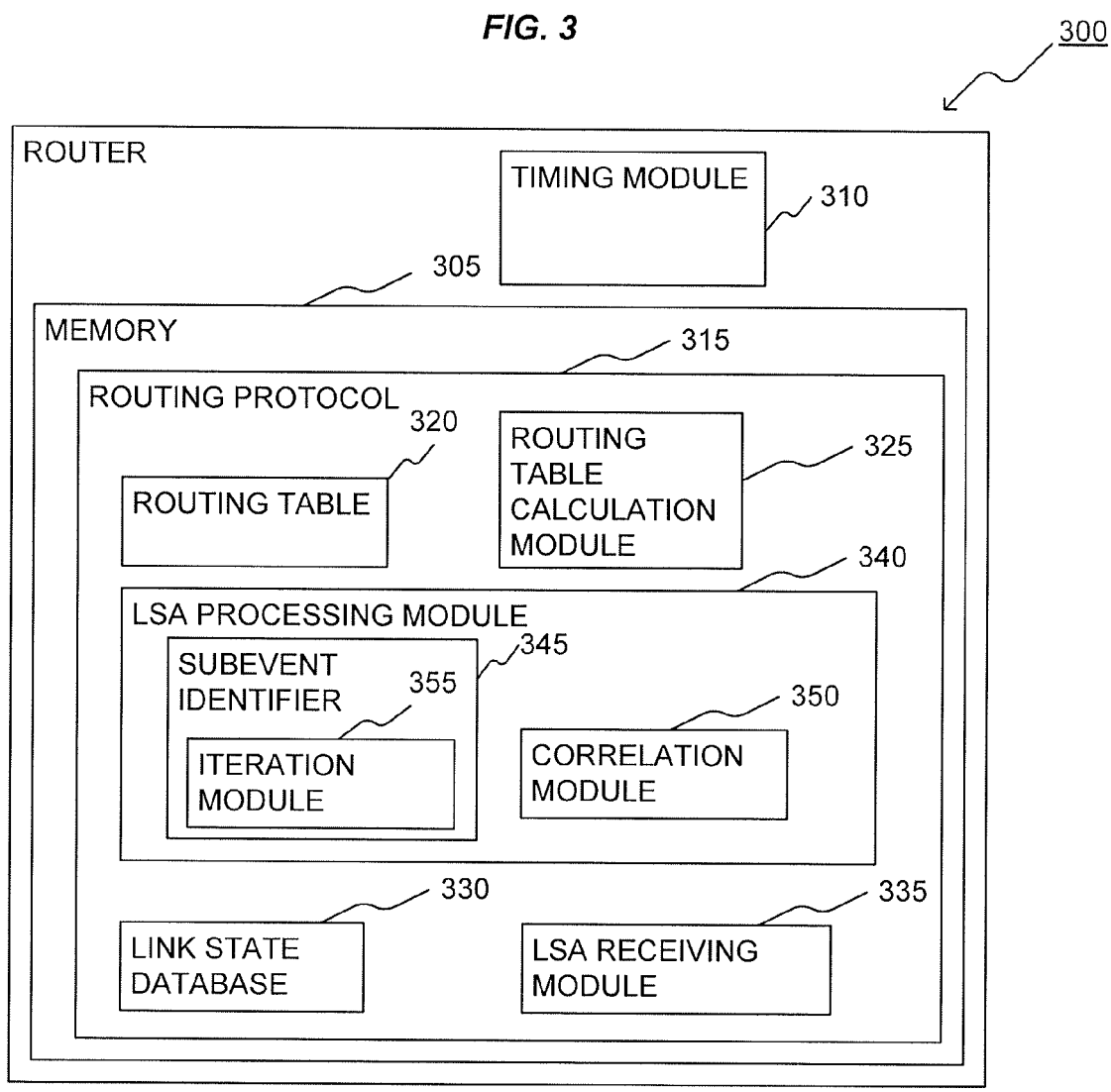
FIG. 3 is a table listing different link types in OSPF and corresponding link states in an LSA.
FIG. 3a is an exemplary routing system according to the invention.

FIG. 3a shows an exemplary router 300 for use with the invention. The router 300 includes a memory 305 and timer or timing module 310 that can be used to time elapse between events. The timer 310 can be implemented as a software executable timer, or a hardware timer. The memory 305 also stores therein software, hardware, and/or firmware modules such as a routing protocol 315 that specifies how the router 300 communicates information with other entities such as other routers. The routing protocol 315 includes a routing table 320, a routing table calculation module 325, a link state database ("LSDB") 330, a link state receiving module 335 configured to receive a current instance of LSA, and a LSA processing module or processor 340 that further includes a subevent identifier 345 and a correlation module 350. The subevent identifier 345 further includes an iteration module 355 configured to iterate through contents of LSA received and previous instances of LSA. In some embodiments, the routing table 320 stores routes and/or metrics to communicate information. In some embodiments, the timing module 310 can also be a module within the memory 310 and the routing protocol 315. Although the modules are shown as a portion of the memory 305, the modules can also be implemented external to the memory 305. Functions of these modules are detailed hereinafter.

The LSA correlation process generally requires each router to maintain the following data structures. Additionally, the correlation process generally requires the ability to iterate through the new and old instances of an LSA. In the following discussion, n refers to the number of nodes in the OSPF area network topology.

A. Data Structures for LSA Correlation 1) adjStatus[ ][ ], cost[ ][ ], stubStatus[ ]: adjStatus[ ][ ] is an n×n boolean array storing a current status of a node's adjacency with another node. The cost[ ][ ] is an n×n array that stores an OSPF cost of the unidirectional link between two nodes. The stubStatus[ ] is a boolean array that stores a current status of a stub (type 3) link.

2) nodeStatus[ ], numAdjs[ ], numNbrs[ ]: These arrays store the following information about each node in the topology: the operational status (up/down) of the node, the number of its bidirectional adjacencies and the number of neighbor nodes with whom this node can develop an adjacency. The nodeStatus of a node is reset when it goes down and stays false until the node has established bidirectional adjacency with all its neighbors.

3) nodeDownActive[ ]: A boolean array with n entries used in the topology change identification process. The jth entry in this array indicates if node j could be in the process of going down. Entry nodeDownActive[j] is set to true when a neighbor breaks adjacency with node j. This entry is reset when all neighbors of node j have broken adjacency with it (i.e. it is confirmed that node j is down) or if a new LSA is received from node j (i.e. it is confirmed that node j is not down).

4) doSPF, scheduleSPF: A true value for doSPF flag indicates that some new LSAs have not yet been assimilated in the routing table. This flag is set to true when a new LSA is processed but it is not yet possible to identify the topology change that led to its generation. The doSPF flag has a timer associated with it. Setting this flag to true starts the timer and resetting the flag stops the timer. When the timer fires, a routing table update is performed and doSPF flag is reset. A routing table update done for some other reason also causes doSPF to be reset. The scheduleSPF variable is used during the LSA processing to record if a routing table update is to be performed immediately after processing the LSUpdate packet containing the LSA.

5) pendingNodes: contains the list of nodes that are currently in the process of coming up (i.e. have established adjacency with at least one neighbor but not with all known neighbors).

To identify a topology change
1) Link Down: A link can be declared "down" if either end breaks adjacency with the other.
2) Link Up: A link can be declared "up" if both ends establish adjacency with each other.

3) Node Down: A node can be declared "down" if no node is currently adjacent to it.
4) Node Up: A node can be declared "up" if it establishes adjacency with all its known neighbors.

Note that a link down event can be a part of a node down event. In case of a link down event, both ends of the link can break adjacency with each other, and hence both ends may generate new LSAs. But for a node down event, the down node may not generate a new LSA. Hence, one way to distinguish a link down event from a node down event is to wait for new LSAs from both ends of the link announcing a breakdown of adjacency with each other. However, such a wait may delay the convergence to the link down events, which are common cases of network failures.

Link down and node down events are detailed as follows. Suppose nodes i and j are currently adjacent to each other. Further, suppose the nodeDownActive[j] entry is false. This means that no node has recently broken adjacency with node j. A receiving module receives a new LSA from node i which no longer indicates an adjacency with node j. Now, the topology change that led to the generation of this LSA could be the failure of link (i:j) or the failure of node j itself. In response to node i breaking adjacency with node j, a routing table update is immediately scheduled (scheduleSPF set to true), thereby ensuring quick convergence to a possible link (i:j) down event. To prepare for the possibility that node j is down, LSA correlation sets nodeDownActive[j] to true. If node j is not down, it may soon generate a new LSA announcing the break down of its adjacency with node i. This LSA can cause the nodeDownActive[j] to be reset (and a routing table update to be scheduled if required). On the other hand, if node j indeed went down, LSA correlation should soon receive LSAs from its other neighbors indicating break down of their adjacency with node j. Suppose, LSA correlation receives one such LSA from node k showing that it is no longer adjacent with node j. This time, since nodeDownActive[j] flag is true, LSA correlation does not schedule an immediate routing table update. Rather, LSA correlation decrements the count of the bidirectional adjacencies associated with nodes j and k, set doSPF variable to true (indicating that some new LSAs have not yet been assimilated in the routing table) and wait for other nodes currently adjacent to node j to break their adjacency too. A routing table update is scheduled when no node is adjacent to node j any more. This solution may allow convergence to link or node down events to be quick. A link down event requires one routing table update while a node down event requires two.

In case node j is down but it is not possible to receive adjacency breakdown indications from all its currently adjacent neighbors (because they are down too or they can no longer be reached), a routing table update is performed when the timer associated with the doSPF variable expires. On the identification of a node down event, all the adjacencies (the adjStatus[ ][ ] entries) and stub networks (stubStatus[ ]) associated with the node are marked as down. This step requires iterating through the previous instance of LSA received from the down node and has a time complexity of O(k), where k is the number of link states in the LSA.

Similarly, a link up event could actually be a part of a node up event. These two events can be distinguished using the information in the nodeStatus[ ] array, which contain true entries for both ends of the link only in case of a pure link up event. If either end of the link has a false nodeStatus (i.e. at least one end of the link is not currently up), the link up event is to be a part of a node up event.

A node up event is declared when bidirectional adjacency exists between the newly up node and all its known neighbors (stored in the node's numNbrs[ ] entry). The number of neighbors for a node can be statically configured or dynamically determined from the information contained in the node's LSA. Table I as shown in FIG. 3 shows different types of OSPF links and the information contained in an LSA for each link type. As shown, max(type 3 link states, type 1/2/4 link states) gives a number of neighbors for the node originating the LSA. LSA correlation counts only bidirectional adjacencies in the test for node up event since, in OSPF, the routing table update uses only those links where bidirectional adjacency exists between the two ends. To deal with the possibility that a newly up node may not establish adjacency with all its neighbors (or the numNbrs[ ] array may not capture the neighbor set of the node correctly), LSA correlation sets the doSPF variable to true if at least one bidirectional adjacency exists for this node. The expiry of the timer associated with the doSPF variable can cause a routing table update, thereby assimilating all the new LSAs received so far.

To avoid multiple routing table updates when multiple node up events take place in quick succession (e.g. a network-wide router reboot), LSA correlation keeps track of the list of the nodes that are in the process of coming up. This information is maintained in the pendingNodes object using a data structure that supports efficient insertions and deletions. If pendingNodes object is implemented as a self-balancing binary search tree, the insertions and deletions have an O(log n) time complexity. Receipt of a new LSA from a node with false nodeStatus causes its node ID to be inserted into pendingNodes object. With pendingNodes implemented as a self-balancing binary search tree, this step causes the time complexity associated with step 1 of LSA correlation process to become O(k+log(n)). When a node has established adjacency with all its neighbors (i.e. is declared up), its ID is removed from the pendingNodes object, and a routing table update is performed if the pendingNodes list is now empty.

With this optimization, LSA correlation can avoid multiple routing table updates in the event of multiple concurrent node up events. For safety, a pendingNodesTimer is started every time a routing table update is postponed because of non-empty pendingNodes. The firing of this timer causes a routing table update to take place if the pendingNodes is still not empty. The LSA correlation implementation, used to conduct simulations discussed hereinafter, includes this optimization. Another optimization used in our implementation is to avoid a routing table update if a topology change is identified based on the information in an LSA received as part of the link state database exchange during adjacency establishment with a neighbor. This optimization can keep the database exchange process from triggering routing table updates as the network topology is discovered. Once the database exchange is over and adjacency established, the LSAs generated as a result can be correlated, which causes a routing table update to take place.

Note that it is possible to extend the LSA correlation concept to identify a shared risk link group ("SRLG") failure if prior information is available about the individual link or router failures resulting from an SRLG failure. Also, it is possible to design a fixed or exponential hold time based scheme to limit the number of routing table updates in case of multiple topology changes occurring concurrently. In such a scheme, individual topology changes, identified via LSA correlation, could serve as the triggers for driving the scheme's state machine. Further, it is possible to identify and handle pathological conditions such as link flaps using the up/down subevents generated during the LSA correlation process.

Table II, as shown in FIG. 4, shows the pseudocode for the complete LSA correlation process for a router LSA. The pseudocode can easily be extended to handle network LSAs as well.

In the following, the behavior of fixed and exponential hold time schemes by modeling a plurality of expected values for a convergence delay and a number of routing table updates performed for convergence when one or more topology changes take place is analyzed. A convergence delay for a router is defined to be a time delay between a receipt of a previous instance of LSA generated due to a topology change and a beginning of a routing table update performed following the receipt of the LSA. This definition for convergence delay is generally valid since the convergence to the topology change(s) is not considered complete until all the LSAs generated as the result of the topology change(s) have been assimilated into the routing table. However, for an isolated link down event, only the first LSA (of the two LSAs generated) may need to be assimilated into the routing table for convergence because a link is used for routing purpose only if both ends of the link consider each other OSPF adjacent. Hence, in case of isolated link failures, the convergence delay can be defined as the delay between the receipt of the first LSA generated due to the topology change and the following routing table update. Note that, in case of an isolated link failure, the convergence delay can be same as the spfDelay and one or two routing table updates can be required for convergence. For other topology change scenarios, the expected values for convergence delay and routing table updates performed for convergence may depend on the values of spfDelay, initial or maximum spfHoldTime, initReturnTime, the number of LSAs generated due to the topology change(s) and the time interval over which these LSAs arrive at a router. In the following, the behavior of the exponential hold time scheme. The same model may work for the fixed hold time scheme after minor modifications is modeled.

A. Modeling the Behavior of the Exponential Hold Time Scheme

Consider the exponential hold time scheme shown in FIG. 2. Let f(n,T) and $f_d(n,T)$ denote the expected values for the number of routing table updates and the convergence delay when a router is in the INIT state 205 and expects to receive n new LSAs over a period T with the first LSA arriving at time 0. Assume that LSA arrivals are uniformly distributed over time T. The first LSA, arriving at time 0, can trigger a routing table update at time D, the spfDelay duration. For now, assume that the time required for a routing table update is generally negligible. If all n LSAs arrive within time D (with last LSA arriving at time t), only one routing table update may be required for convergence and the convergence delay is (D−t). Otherwise, suppose j more LSAs arrive before the routing table update at time D. At time D, the router moves to the SPF state 215 with (n−1−j) LSAs still to come over time (T−D). Let g(n,T,m) and $g_d(n,T,m)$ denote the expected values for the number of routing table updates and convergence delay when a router enters the SPF state 215 at time 0 and expects to receive n new LSAs over a period T with current value of spfHoldTime being $2^m H$, where H is the initial value for spfHoldTime. Thus, f(n,T) and $f_d(n,T)$ are expressed as follows:

$$f(n, T) = \begin{cases} 1 & n = 1, T \geq 0 \\ 1 & n > 1, T \leq D \\ 1 & n > 1, T > D, \\ & \text{with probability } \left(\frac{D}{T}\right)^{n-1} \\ & T > D, n > 1, 0 \leq j \leq n-2, \\ 1 + g(n-1-j, T-D, 0), & w \cdot p \cdot \binom{n-1}{j}\left(\frac{D}{T}\right)^j\left(\frac{D}{T}\right)^{n-j-1} \end{cases}$$

-continued $$f_d(n, T) = \begin{cases} D & n = 1, T \geq 0 \\ D-t & n > 1, T \leq D, t \leq T, \\ & \text{with probability } \frac{n-1}{T}\left(\frac{t}{T}\right)^{n-2} \\ D-t & n > 1, T > D, t \leq D, \\ & \text{with probability } \frac{n-1}{T}\left(\frac{t}{T}\right)^{n-2} \\ & T > D, n > 1, 0 \leq j \leq n-2, \\ 1 + g(n-1-j, T-D, 0), & w \cdot p \cdot \binom{n-1}{j}\left(\frac{D}{T}\right)^j\left(1-\frac{D}{T}\right)^{n-j-1} \end{cases}$$

When a router enters the SPF state, it starts the spfHoldTimer setting it to fire after $2^m H$ seconds, the current spfHoldTime value. If one or more LSAs are received while the spfHoldTimer is running, the router enters the SPF Hold state 220 and doubles the spfHoldTime (for now, no upper limit on spfHoldTime value is assumed). When the router is in SPF HOLD state 220, the firing of the spfHoldTimer causes a routing table update to take place and the router returns to the SPF state 215 with the spfHoldTimer restarted with new value of spfHoldTime. Suppose, a router enters the SPF state 215 expecting n LSAs to arrive over time T with $2^m H$ being the current spfHoldTime. If all n LSAs arrive while the spfHoldTimer is still running, with last LSA arriving at time t, the routing table update performed on the firing of the spfHoldTimer leads to convergence and the convergence delay can be ($2^m H - t$). If the router receives j LSAs, where $1 \leq j \leq (n-1)$, while the spfHoldTimer is running, the spfHoldTime doubles, a routing table update takes place when the spfHoldTimer fires and the router returns to SPF state 215 expecting (n−j) more LSAs to arrive over time ($T - 2^m H$). Thus, in this case, the router can expect to perform $g(n-j, T-2^m H, m+1)$ more routing table updates and the expected convergence delay $g_d(n-j, T-2^m H, m+1)$. On the other hand, if the router does not receive any LSA while the spfHoldTimer is running, it may enter the SPF HOLD OVER state 225 expecting to receive n LSAs over time $T - 2^m H$. Let h(n, T, m) and $h_d(n, T, m)$ denote the expected values for the number of routing table updates and convergence delay when a router enters the SPF HOLD OVER state 225 and expects to receive n new LSAs over a period T with current value of spfHoldTime being $2^m H$. Thus, g(n, T, m) and $g_d(n, T, m)$ are expressed as follows:

$$g(n, T, m) = \begin{cases} 1 & n = 1, T \geq 0 \\ 1 & T \leq 2^m H \\ 1 & T > 2^m H, \text{with probability } \left(\frac{2^m H}{T}\right)^n \\ & T > 2^m H, n > 1, 1 \leq j \leq n-1, \\ 1 + g(n-j, T-2^m H, m+1), & w \cdot p \cdot \binom{n-1}{j}\left(\frac{2^m H}{T}\right)^j\left(1-\frac{2^m H}{T}\right)^{n-j} \\ h(n, T-2^m H, m) & T > 2^m H, w \cdot p \cdot \left(1-\frac{2^m H}{T}\right)^n \end{cases}$$

-continued $$g_d(n, T, m) =$$

$$\begin{cases} 2^m H - t & T \geq 2^m H, t \leq T, w \cdot p \cdot \left(\frac{n}{T}\right)^j \left(\frac{t}{T}\right)^{n-1} \\ 2^m H - t & T \geq 2^m H, t \leq 2^m H, w \cdot p \cdot \left(\frac{n}{T}\right)^j \left(\frac{t}{T}\right)^{n-1} \\ & T > 2^m G, n > 1, 1 \leq j \leq n-1, \\ g_d(n-j, T - 2^m H, \text{mm}+1) & w \cdot p \cdot \binom{n}{j} \left(\frac{2^m H}{T}\right)^j \left(1 - \frac{2^m H}{T}\right)^{n-j} \\ h_d(n, T - 2^m H, m), & T > 2^m H, w \cdot p \cdot \left(1 - \frac{2^m H}{T}\right)^m \end{cases}$$

When the router is in the SPF HOLD OVER state 225, the receipt of an LSA may lead to an immediate routing table update followed by transition to the SPF state 215. Otherwise, the firing of the initReturnTimer may cause the router to move to the INIT state 205. Note that each receipt of an LSA causes the initReturnTimer to be restarted and the initReturnTime (I) is always at least as large as the current spfHoldTime. In the following expressions, the expected arrival time (Et) of the first LSA while in the SPF HOLD OVER state 225 is used to relate $h/h_d$ functions to $f/f_d$ and $g/g_d$ functions.

$$h(n, T, m) =$$

$$\begin{cases} 1 & n = 1 \\ & T \leq I - 2^m H, n > 1, \\ 1 + g(n-1, T - Et, m) & Et = \int_0^T t \frac{n}{T} \left(1 - \frac{t}{T}\right)^{n-1} dt \\ & T > I - 2^m H, n > 1, \\ f(n, T - I + 2^m H - Et) & w \cdot p \cdot \left(1 - \frac{I - 2^{mm} H}{T}\right)^n, \\ 1 + g(n-1, T - Et, m+1), & Et = \int_0^{I - 2^m H} t \frac{n}{T} \left(1 - \frac{t}{T}\right)^{n-1} dt \end{cases}$$

$$h_d(n, T, m) =$$

$$\begin{cases} 0 & T \leq I - 2^m H, n = 1 \\ & T \leq I - 2^m H, n > 1, \\ g_d(n-1, T - Et, m) & Et = \int_0^T t \frac{n}{T} \left(1 - \frac{t}{T}\right)^{n-1} dt \\ 0 & T > I - 2^m H, n = 1, w \cdot p \cdot \frac{I - 2^m H}{T} \\ & T > 2^m H, w \cdot p \cdot \left(1 - \frac{I - 2^m H}{T}\right)^n, \\ f_d(n, T - I + 2^m H - Et) & Et = \int_0^{T - I + 2^m H} t \frac{n}{T - I + 2^m H} \\ & \left(1 - \frac{t}{T - I + 2^m H}\right)^{n-1} dt \\ & T > I - 2^m H, nI, w \cdot p \cdot 1 - \left(1 - \frac{I - 2^m H}{T}\right), \\ g_d(n-1, T - Et, m+1), & Et = \int_0^{I - 2^m H} t \left(\frac{n}{T}\right)^{n-1} dt \end{cases}$$

The expressions, developed above, can be used to model the fixed hold time scheme's behavior by always using 0 as the value of m. Assuming that the spfHoldTimer starts at the same time as a routing table update, the non-negligible routing table update time (C) can be taken into account by replacing $2^m H$ in the expressions above with max(C, $2^m H$). An upper limit on the spfHoldTime can be enforced by modifying the $g/g_d$ expressions so that the m value does not increase if it may cause the spfHoldTime to increase beyond its maximum value. Finally, the initReturnTime is generally set to be at least as large as the current spfHoldTime by replacing I with max(I, $2^m H$).

To verify the correctness of the model developed above, extensive simulations are performed using a modified ospfd simulator for both fixed and exponential hold time schemes using a wide range of total number of LSAs (n) generated as a result of a topology change and the time periods (T) over which these LSAs arrive at a target router. For each value of T, 30 simulations with 30 different sets of uniformly distributed (over range T) LSA arrival times with first LSA arriving at time 0 are performed. For each simulation, the convergence delay at the target router and the number of routing table updates it performs for convergence is measured. The average values over 30 simulation runs for a single T value are then compared with the values predicted by the model described above.

B. Understanding the Impact of Model Parameters on the Performance of Hold Time Based Schemes In the following, the model developed earlier to understand how the expected values of convergence delay and the number of routing table updates required for convergence change for fixed or exponential hold time schemes as the values of model parameters change is used. The parameters used to model the behavior of the two schemes are: the spfDelay (D), (initial) spfHoldTime (H) and initReturnTime (I); the number of LSAs generated as the result of a topology change (n); and the time interval (T) over which the LSAs arrive at the router.

Impact of initReturnTime (I): The initReturnTime parameter was introduced in the hold time schemes to avoid an untimely return to the INIT state 205 in frequent topology change scenarios where new LSAs are generated continuously but there is a brief (but larger than the current spfHoldTime) lull in their arrival at the router. Also, the initReturnTime is constrained to be at least as large as the current spfHoldTime. As shown in FIGS. 5(*a*) and 5(*b*), the initReturn Time may have minimal impact on the performance of two schemes as long as it is much larger than the expected interval between the arrival of two consecutive LSAs. Small increase in the expected number of routing table updates for fixed hold time scheme, as initReturnTime increases from very small value, can be explained as follows.

If a very small value for initReturn Time forces a router to re-enter the INIT state 205, it may not perform a routing table update on receiving a new LSA until the spfDelay duration is over. During this time, there is a chance to receive a few more LSAs. On the other hand, if initReturnTime is large, the router may stay in SPF HOLD OVER state 225 and perform an immediate routing table update on receiving a new LSA. In the following, a large value (for example, about 10 seconds) for initReturnTime is used to avoid a return to the INIT state 205 from the SPF HOLD OVER state 225 for the range of T values.

Impact of spfDelay (D): FIGS. 5(*c*) and 5(*d*) illustrate the impact of increasing spfDelay on the behavior of two schemes. The behavior of the fixed hold time scheme is explained. In this case, increasing the spfDelay value delays the time of the first routing table update. Hence, the expected number of routing table updates required for convergence decreases linearly with increase in spfDelay until spfDelay becomes larger than T, the time by which all new LSAs should have arrived, and only one routing table update is required for convergence. The spfDelay value has a negligible impact on the convergence delay as long as several routing table updates are required for convergence. As the increase in spfDelay causes only one or two routing table updates to be required for convergence, the delay in doing the last routing table update reflects in an increase in the expected convergence delay. This effect becomes more prominent and results in a linear increase in convergence delay with increase in spfDelay once spfDelay becomes large enough to require only one routing table update for convergence.

Figure 5A:
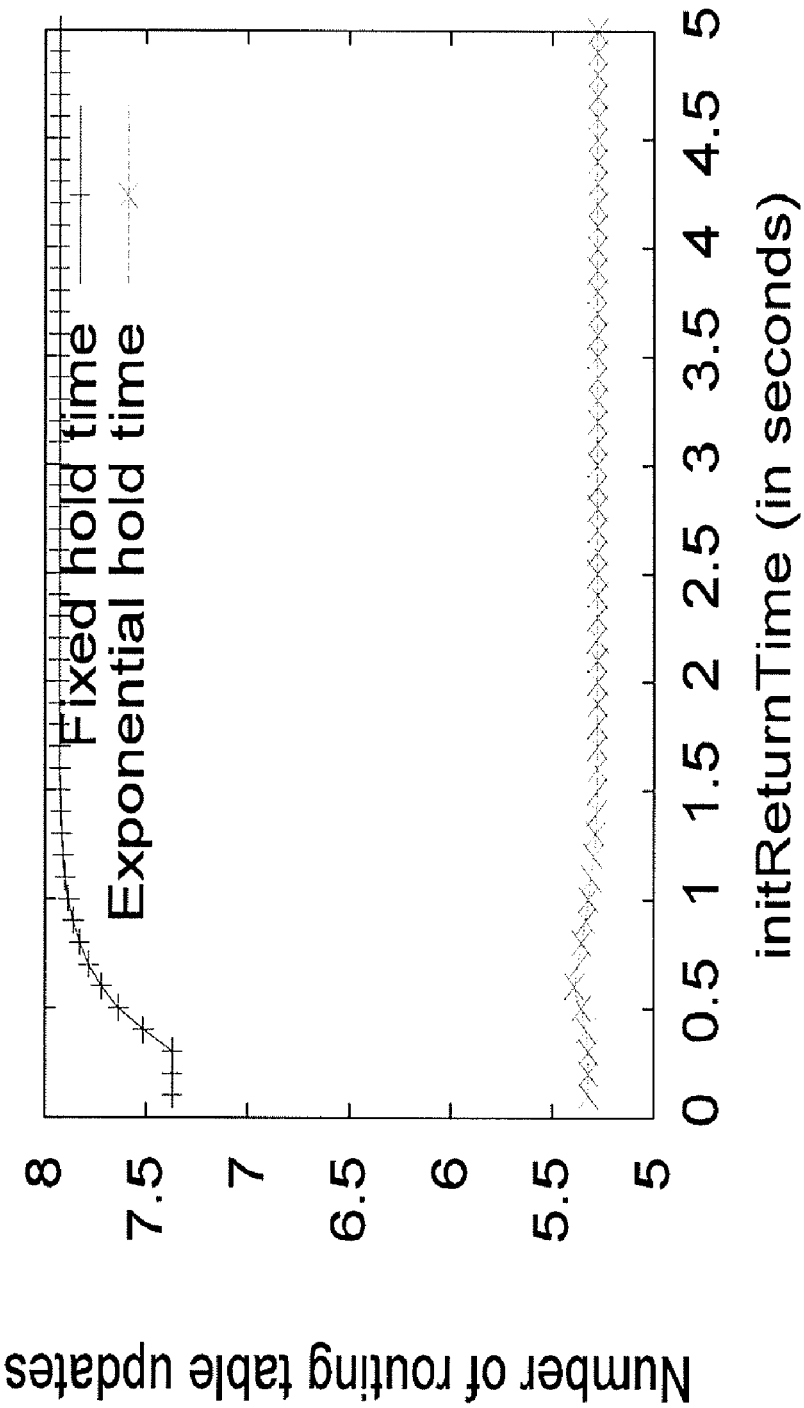
Figure 5B:
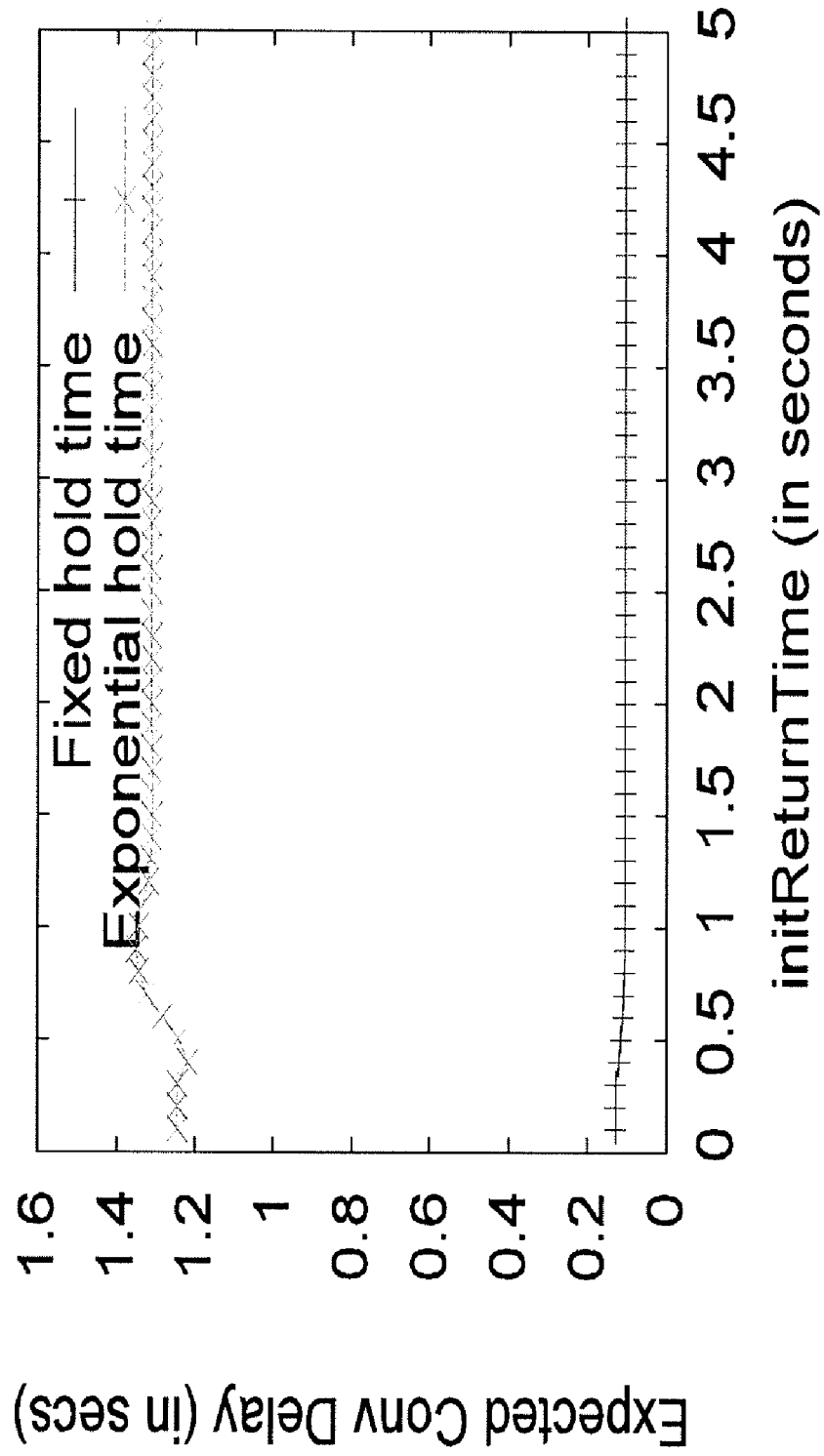
Figure 5C:
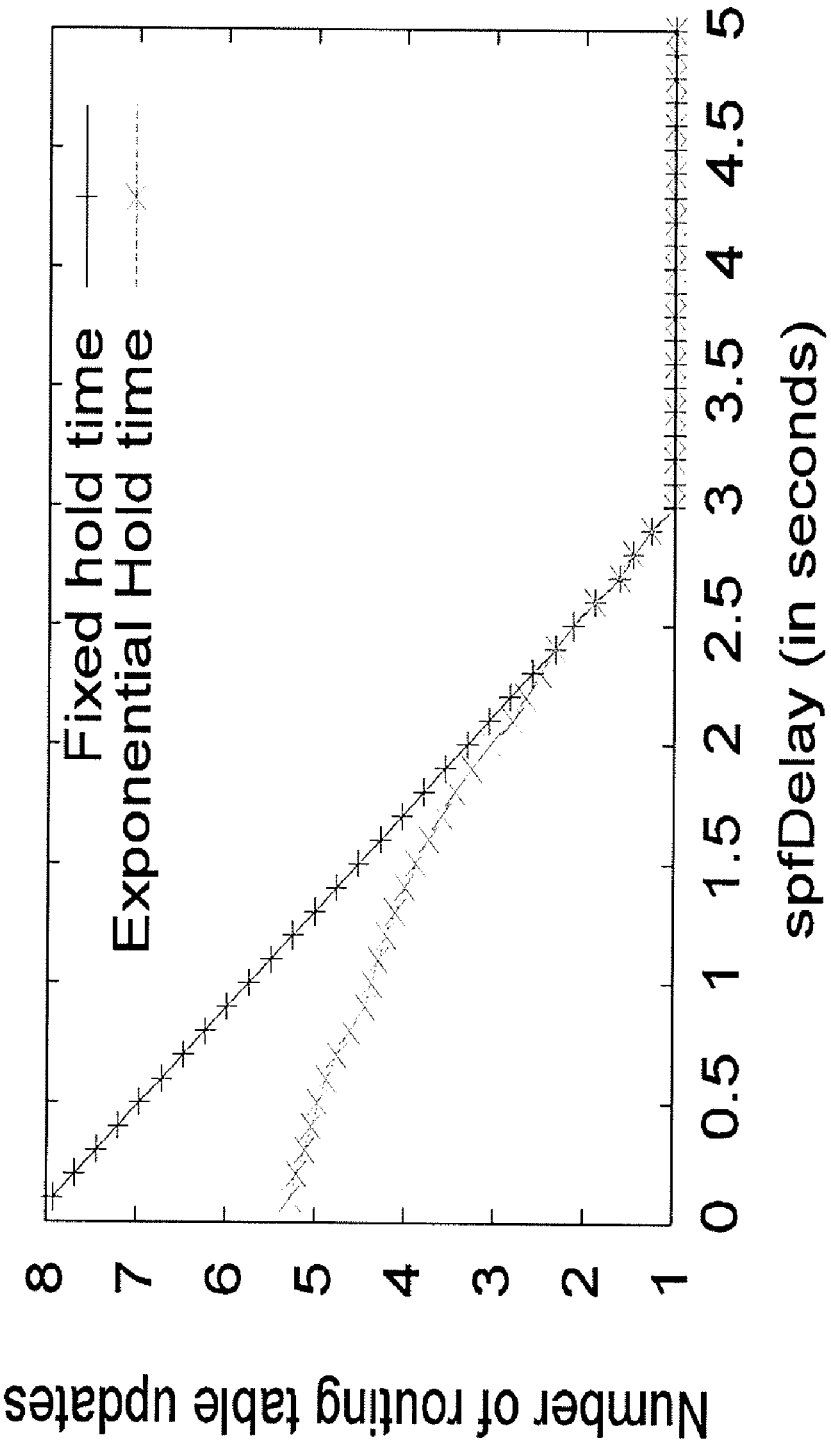
Figure 5D:
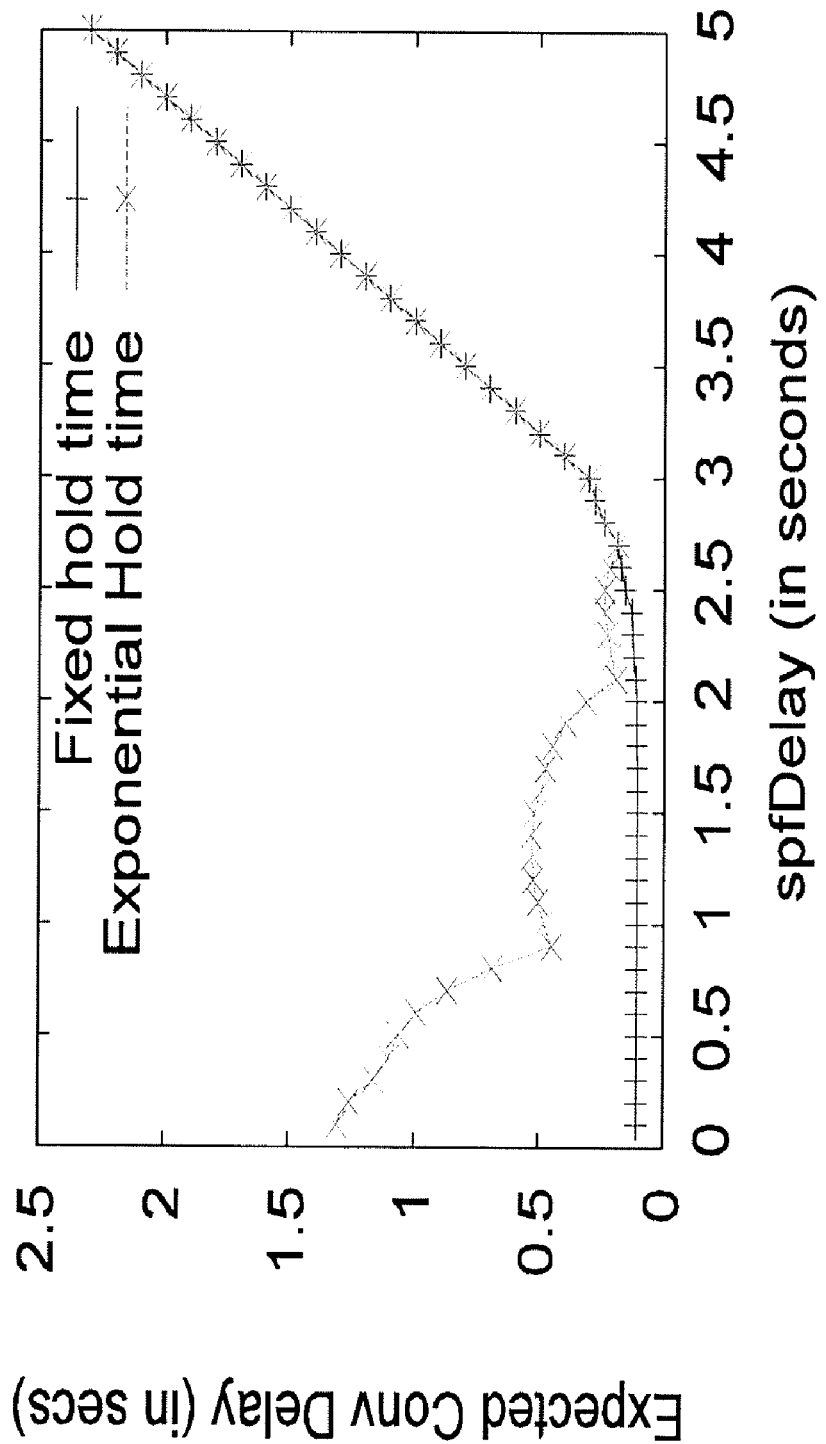

The exponential hold time scheme interacts with spfDelay in a more complicated manner. FIGS. 5(c) and 5(d) have been drawn for the scenario where about 10 LSAs arrive over about 3 seconds with initial spfHoldTime being 0.3 seconds. With spfDelay equal to about 0.1 seconds, the routing table updates are expected to take place at about 0.1, about 0.4, about 1.0, about 2.2, and about 4.6 seconds. With spfDelay equal to about 0.9 seconds, the routing table updates are likely to occur at times about 0.9, about 1.2, about 1.8, and about 3 seconds. Notice that as spfDelay increases from about 0.1 to about 0.9 seconds, the probability that the last LSA arrives before the 4th routing table update increases and as a result expected convergence delay quickly decreases. As spfDelay increases further from about 1 to about 2.1 seconds, the expected time at which the 4th routing table update is done increases almost linearly and the probability of needing only 3 routing table updates for convergence also increases. Initially, the increase in the probability of needing just 3 routing table updates is not sufficient to offset the delay in doing the 4th routing table update and hence the expected convergence delay increases. However, as spfDelay approaches a value of about 2.1 seconds, the increased probability of needing just 3 routing table updates dominates and the expected convergence delay goes down. The same pattern of increase and decrease in the expected convergence delay is repeated as spfDelay increases further. Once spfDelay becomes about 3 seconds, only one routing table update may be required for convergence and any further increase in spfDelay just delays the occurrence of this routing table update, thus causing a linear increase in the expected convergence delay.

In the following discussion, a small value (about 0.1 seconds) for spfDelay is used. This is done because, in practice, spfDelay is set to a small value so as to achieve quick convergence for link failures, the most common types of topology changes.

Figure 5E:
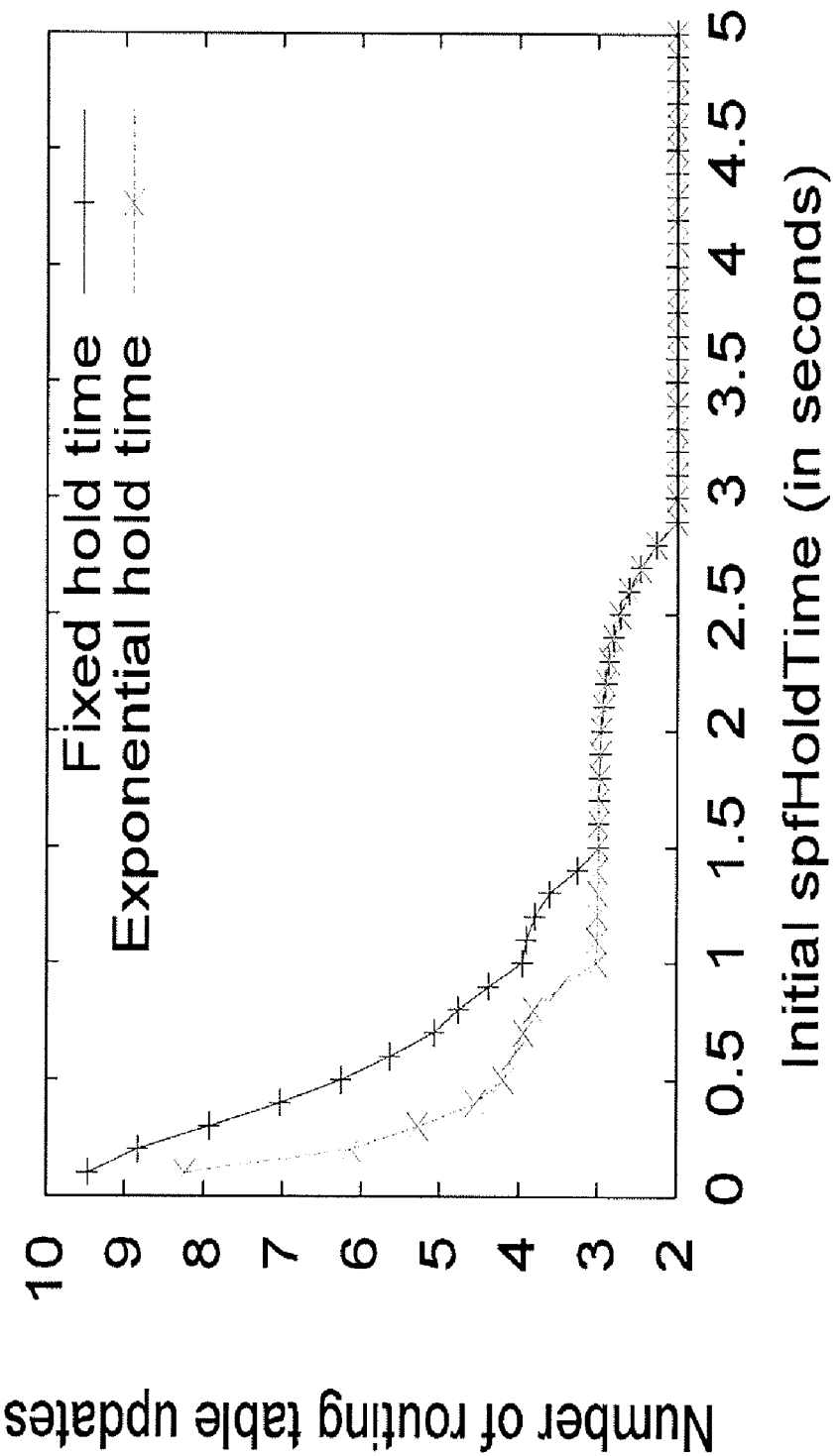
Figure 5F:
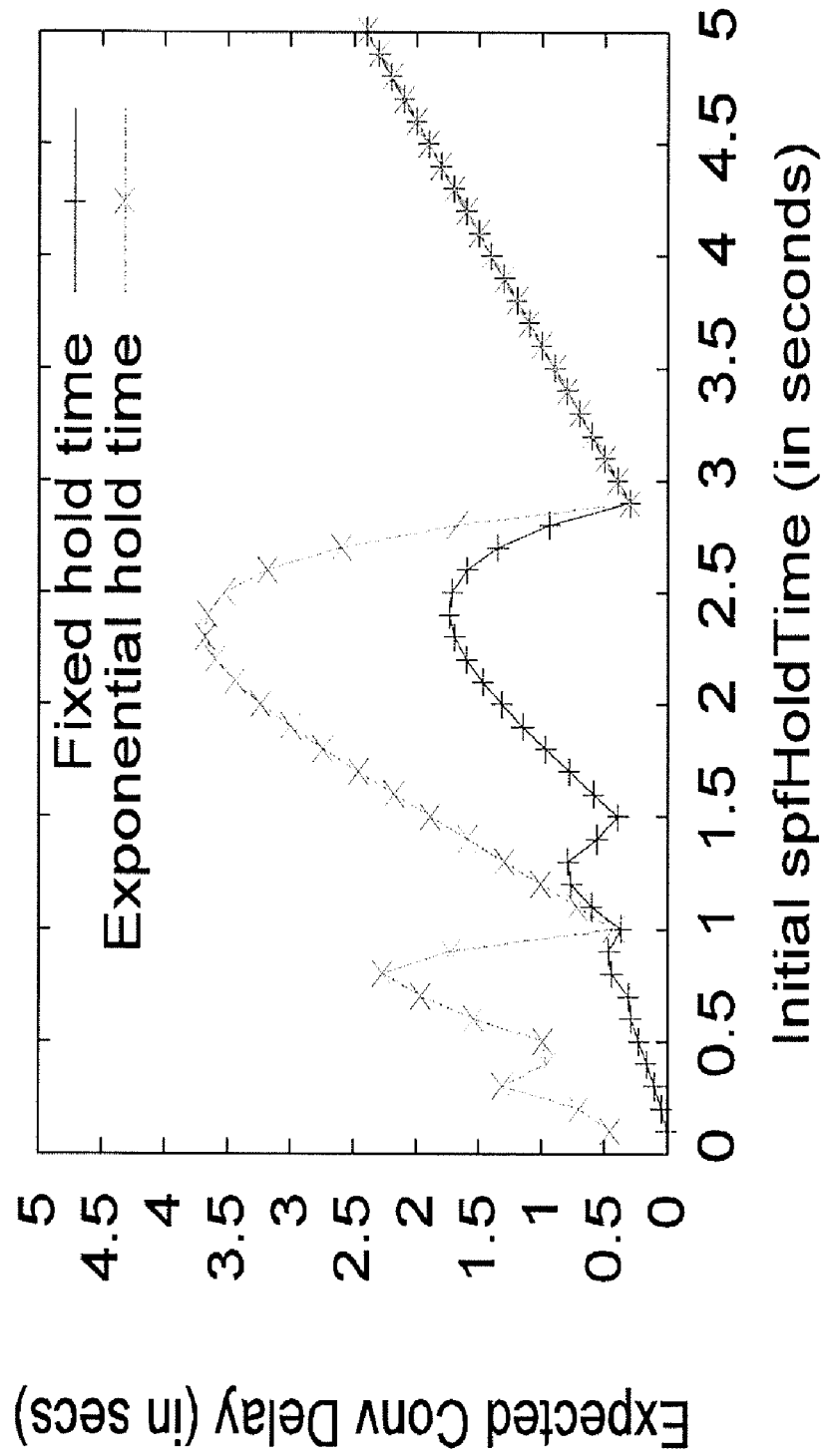
Figure 5G:
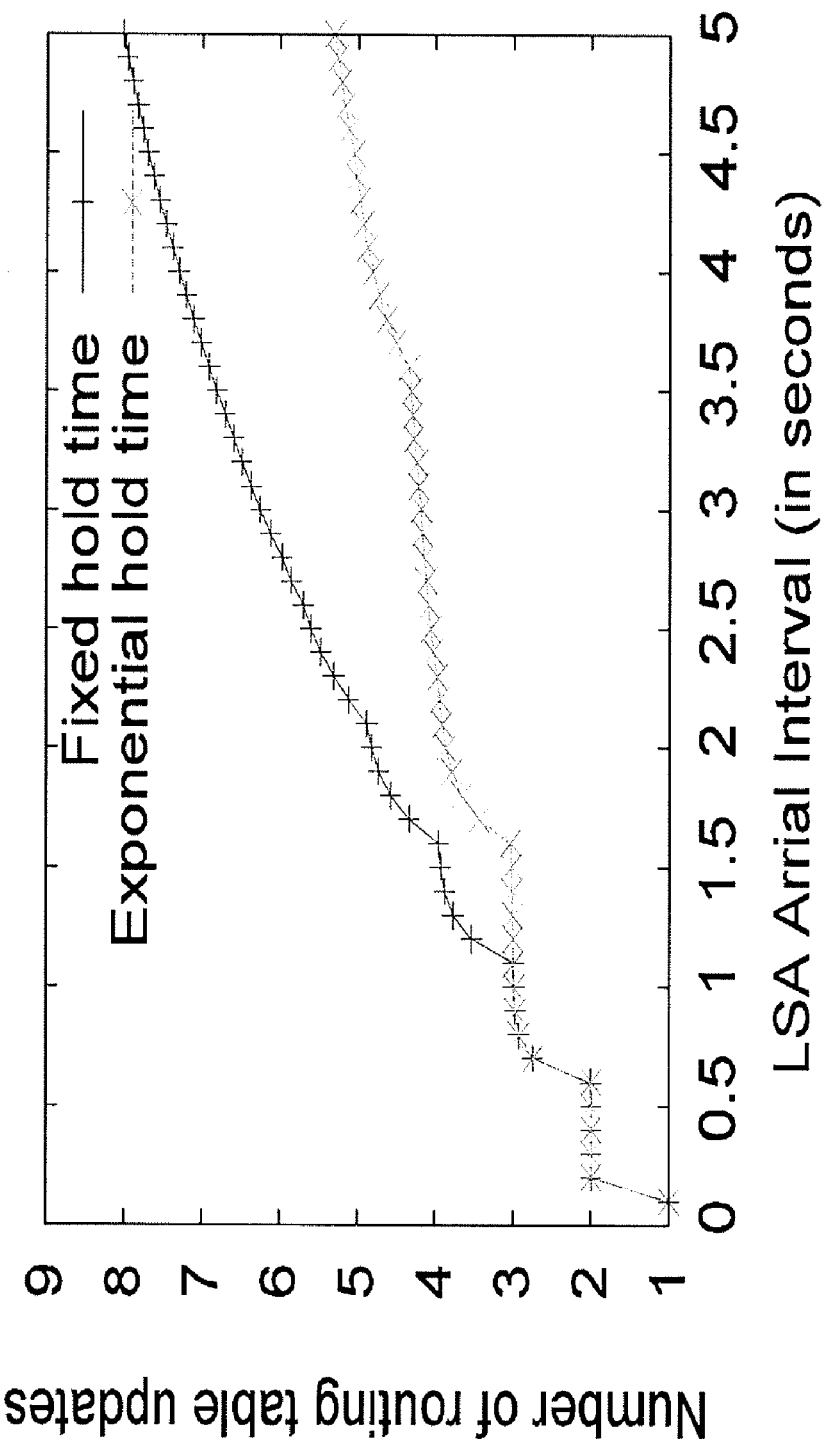
Figure 5H:
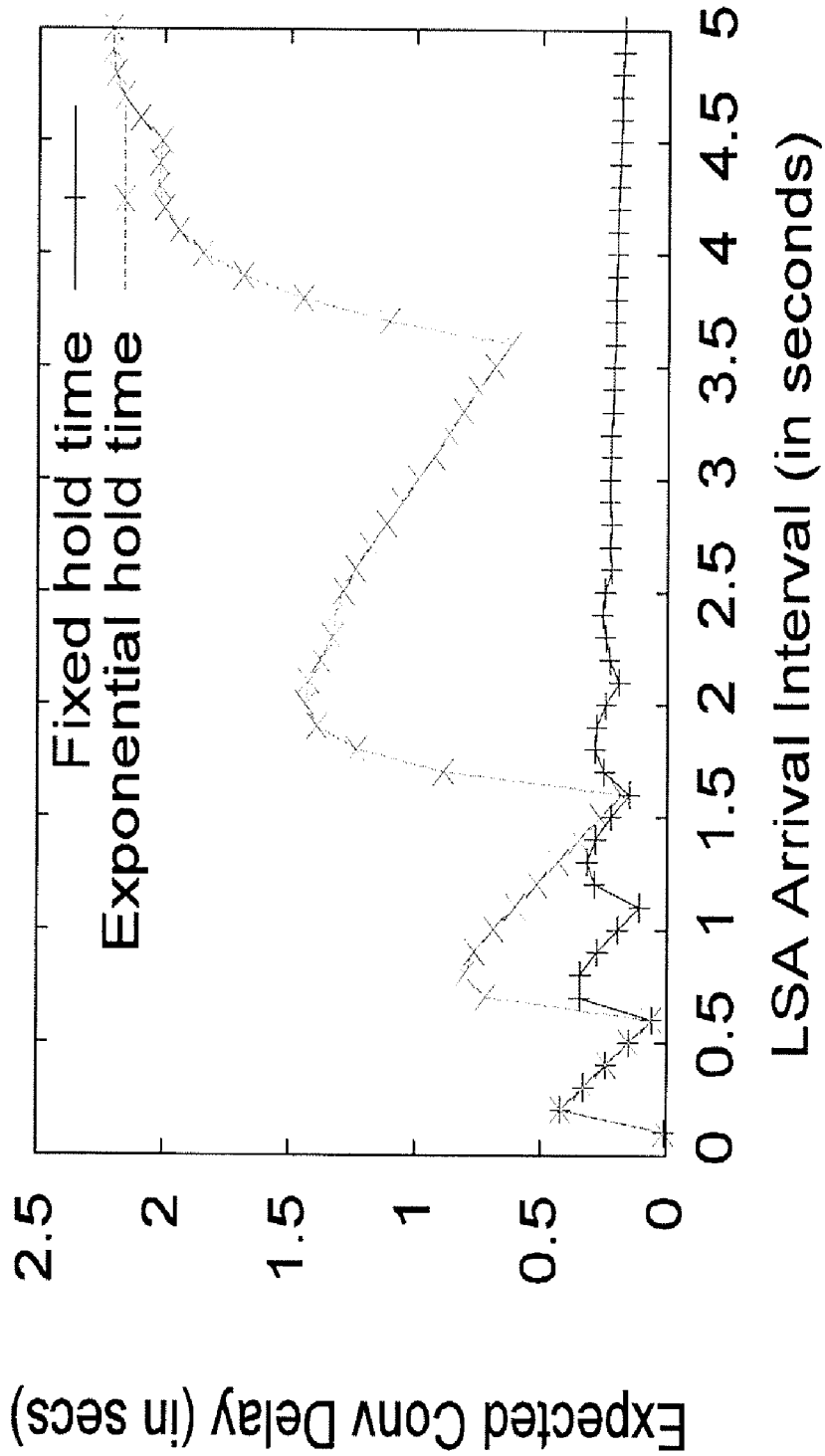
Figure 5I:
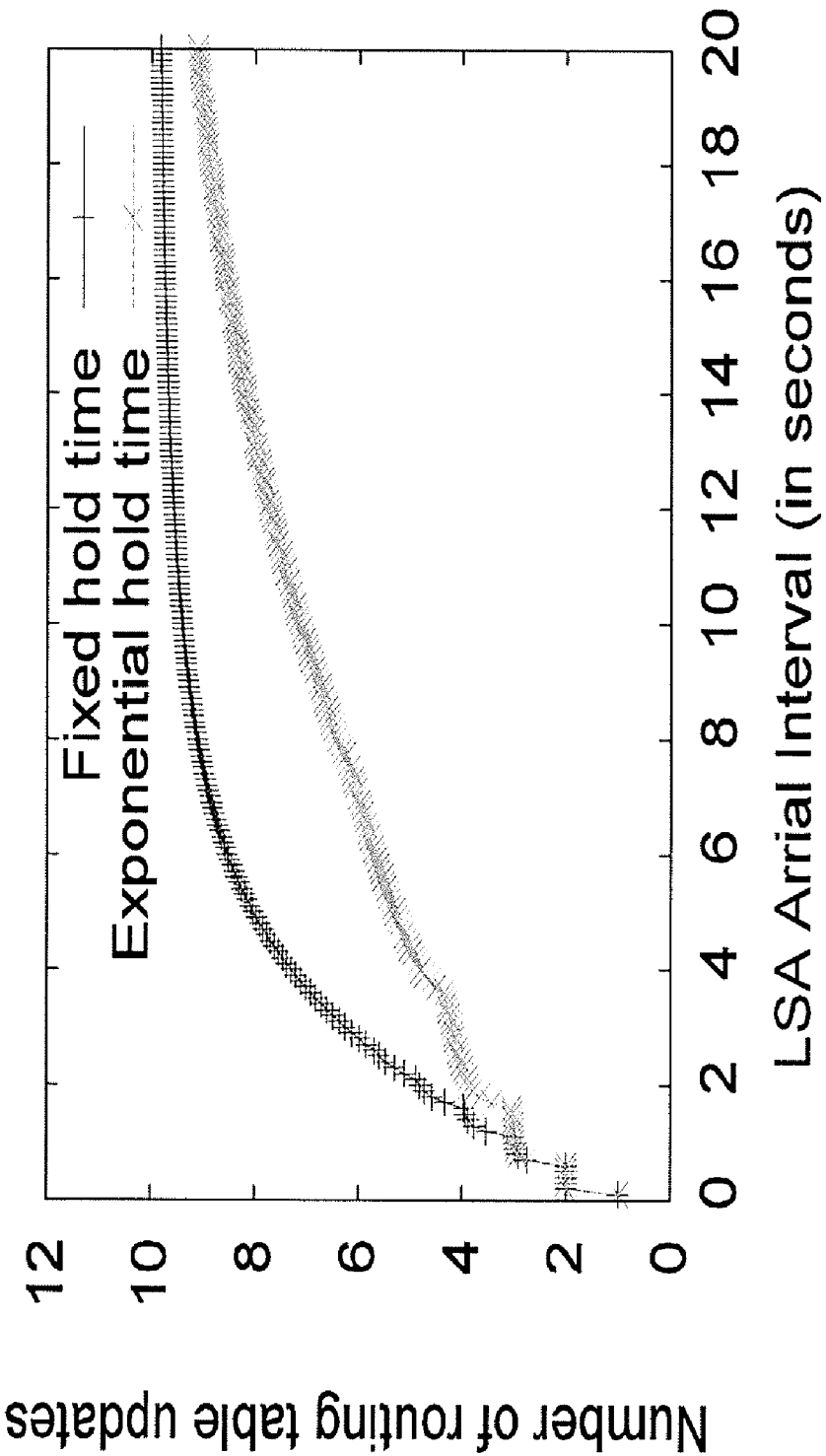
Figure 5J:
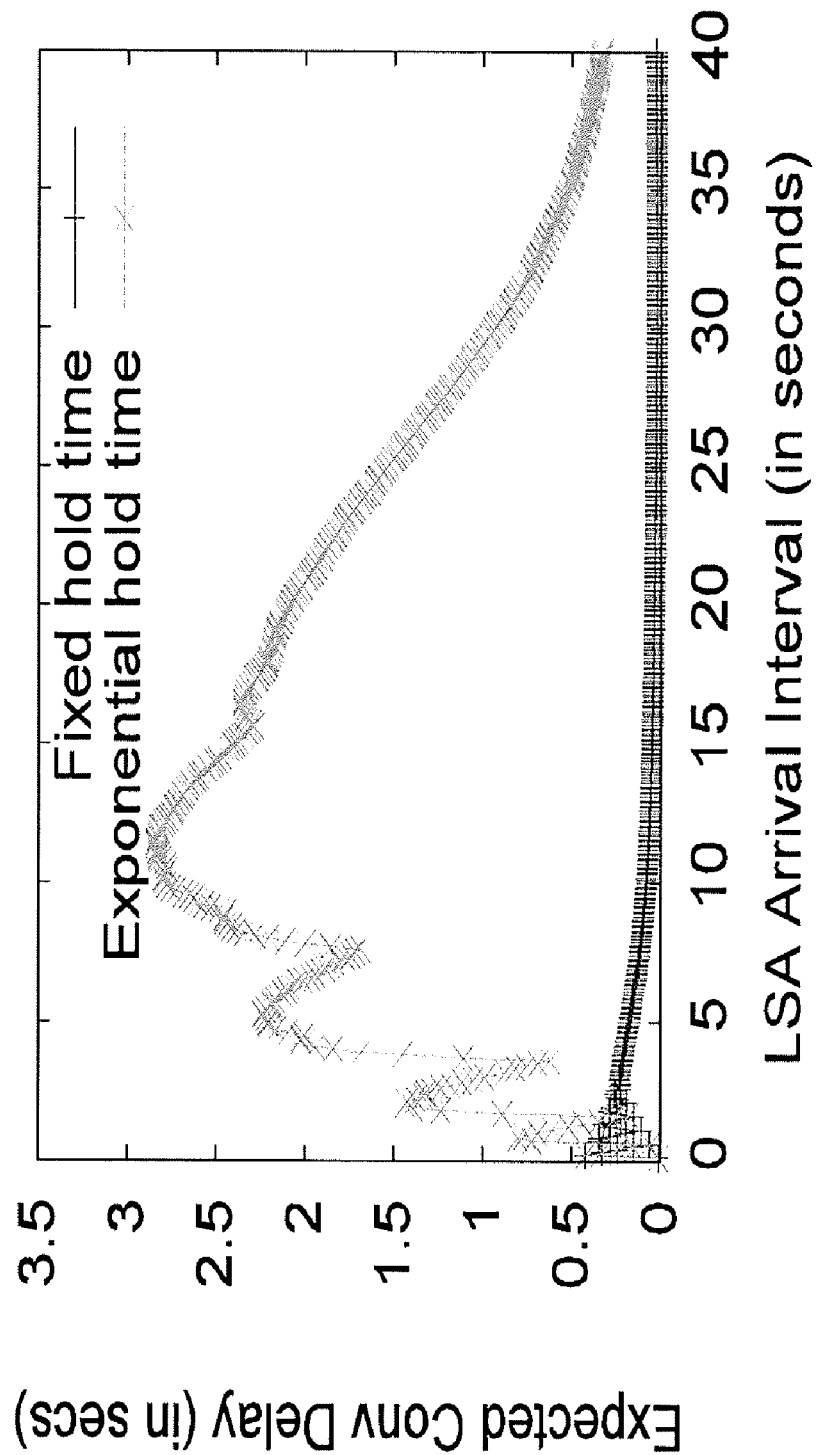

Impact of (initial) spfHoldTime (H): FIGS. 5(e) and 5(f) illustrate the impact of increasing the value of (initial) spfHoldTime on the behavior of two schemes. These curves have been drawn for the scenario where 10 LSAs arrive at a router within 3 seconds and there is no upper limit on the spfHoldTime value. In the following, the changes in the curves with a focus on the behavior of the exponential hold time scheme are explained. The behavior of the fixed hold time scheme could be explained similarly.

First consider the curves for the expected number of routing table updates. Notice the initial steep decline in these curves. With an (initial) spfHoldTime of about 0.1 seconds, it is unlikely that a router may receive an LSA while in SPF state 215. This means that most LSAs are received while the router is in SPF HOLD OVER state 225. For exponential hold time scheme, this means little chance to ramp up the spfHoldTime value. Thus, the fixed hold time scheme ends up doing almost one routing table update for each received LSA and the exponential hold time scheme fares only slightly better. As spfHoldTime value increases, the chances of receiving LSAs while in SPF state 215 improve, which causes a steep decline in expected number of routing table updates. For exponential hold time scheme, larger initial values for spfHoldTime mean good chance for exponential backoff to kick in, which causes a steeper decline in expected number of routing table updates than for the fixed hold time scheme.

After the initial steep decline in the expected number of routing table updates, there is a brief decrease in the rate of decline. For the exponential hold time scheme, this phase corresponds to H values in about 0.5 seconds to about 0.8 seconds range. With H being about 0.5 seconds, the exponential hold time scheme is likely to require 4 routing table updates for convergence (at times about 0.1, about 0.6, about 1.6, and about 3.6 seconds). As H increases further (about 0.6 to about 0.8 seconds), the probability of needing just 3 routing table updates for convergence (rather than 4) improves slowly, causing the decrease in the rate of decline for the routing table update curve. With H being about 1 second, it is almost certain that 3 routing table updates may be needed for convergence. The expected number of routing table updates stay at 3 for a considerable range of H values. As H value increases beyond about 2 seconds, the probability of needing just 2 routing table updates increases, slowly initially and then rapidly. Once H becomes being about 2.9 seconds, only 2 routing table updates are required for convergence.

Now, consider the changes in the expected convergence delay curves. Notice the seesaw shape of the curve for the exponential hold time scheme and its final linear increase region. The expected convergence delay increases quickly for (about 0.5, about 0.8) seconds and (about 1, about 2.4) seconds ranges of H values. For these two ranges of H values, the expected number of routing table updates is close to 4 and 3 respectively. As H value increases in these ranges, the number of routing table updates required for convergence stay same but the time of the last routing table update gets delayed and hence the expected convergence delay increases. On the other hand, the expected convergence delay decreases rapidly for (about 0.8, about 1) seconds and (about 2.4, about 2.9) seconds ranges of H values. As H value increases in these ranges, the probability of needing one less routing table update for convergence increases rapidly and the expected time of the last routing table update is only slightly larger than the expected arrival time for the last LSA. This explains the quick drop in the expected convergence delay. Once H crosses about 2.9 seconds value, only 2 routing table updates are needed for convergence and any further increase in H only delays the timing of the 2nd routing table update, thus resulting in a linear increase in expected convergence delay.

FIGS. 5(e) and 5(f) also provide important insights into the relative performance of the fixed and exponential hold time schemes: for exponential hold time scheme, setting the initial spfHoldTime to a very small value (in comparison to the time interval over which the new LSAs arrive) may make it difficult for exponential backoff to kick in and the expected number of routing table updates could be unacceptably large; and for larger values of the (initial) spfHoldTime, the expected number of routing table updates required for convergence may not be very different for two schemes. Moreover, the fixed hold time scheme is likely to have much better convergence delay than the exponential hold time scheme. As shown, the exponential hold time scheme is not necessarily a better choice than the fixed hold time scheme.

Impact of LSA Arrival Interval (T): FIGS. 5(g) through 5(j) illustrate the behavior of fixed and exponential hold time schemes as the time interval, T, over which LSAs arrive increases. Notice that the curves for the expected number of routing table updates (FIGS. 5(g) and 5(i)) initially exhibit increase in steps of one. The width of each step is equal to the current spfHoldTime duration. Notice that the exponential backoff in spfHoldTime causes the steps to be much wider for exponential hold time scheme than for fixed hold time scheme. During this phase, as the T value increases within the range corresponding to the floor of a step, the arrival time for the last LSA increases but continues to be less than the time of the last (say ith) routing table update. Thus, during this range, the expected convergence delay decreases almost linearly (FIG. 5(h)). At the instant of the step jump, the last LSA arrives just after the ith routing table update. Thus, one more routing table update is required for convergence and there is a steep jump (proportional to the current spfHoldTime) in the convergence delay. However, as the LSA arrival interval becomes significantly larger than the (initial) spfHoldTime (FIGS. 5(i) and 5(j)), the limited number of LSAs means that the probability of receiving an LSA while in SPF state 215 goes down. For large LSA arrival intervals, an LSA is likely to arrive while the router is in SPF HOLD OVER state 225 (assuming that the initReturnTime is large enough to prevent a return to INIT state 205) and thus the router performs a routing table update generally as soon as an LSA is received, thereby causing the expected number of routing table updates to approach the number of LSAs and the expected convergence delay to approach 0.

Figure 5K:
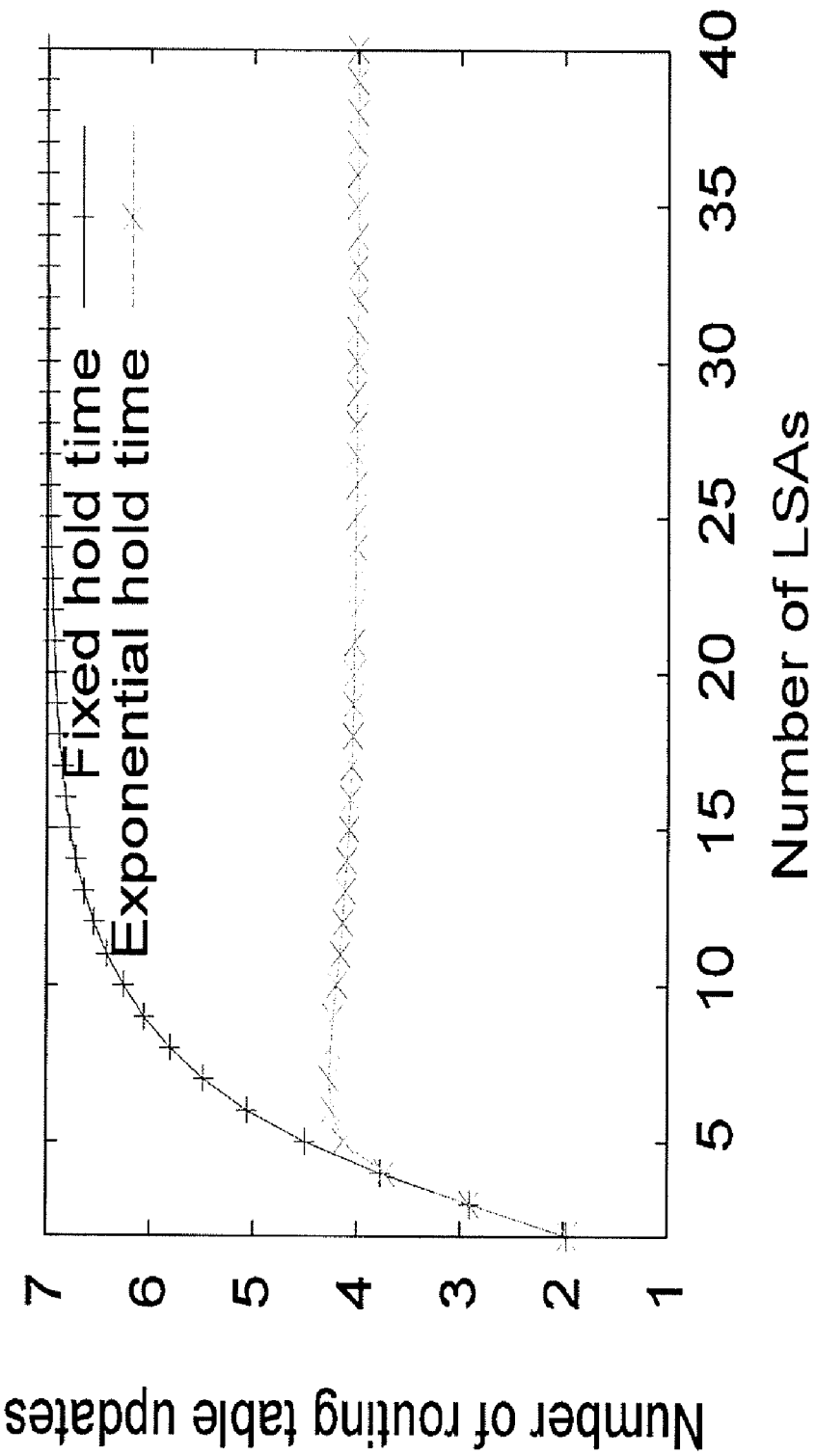
Figure 5I:
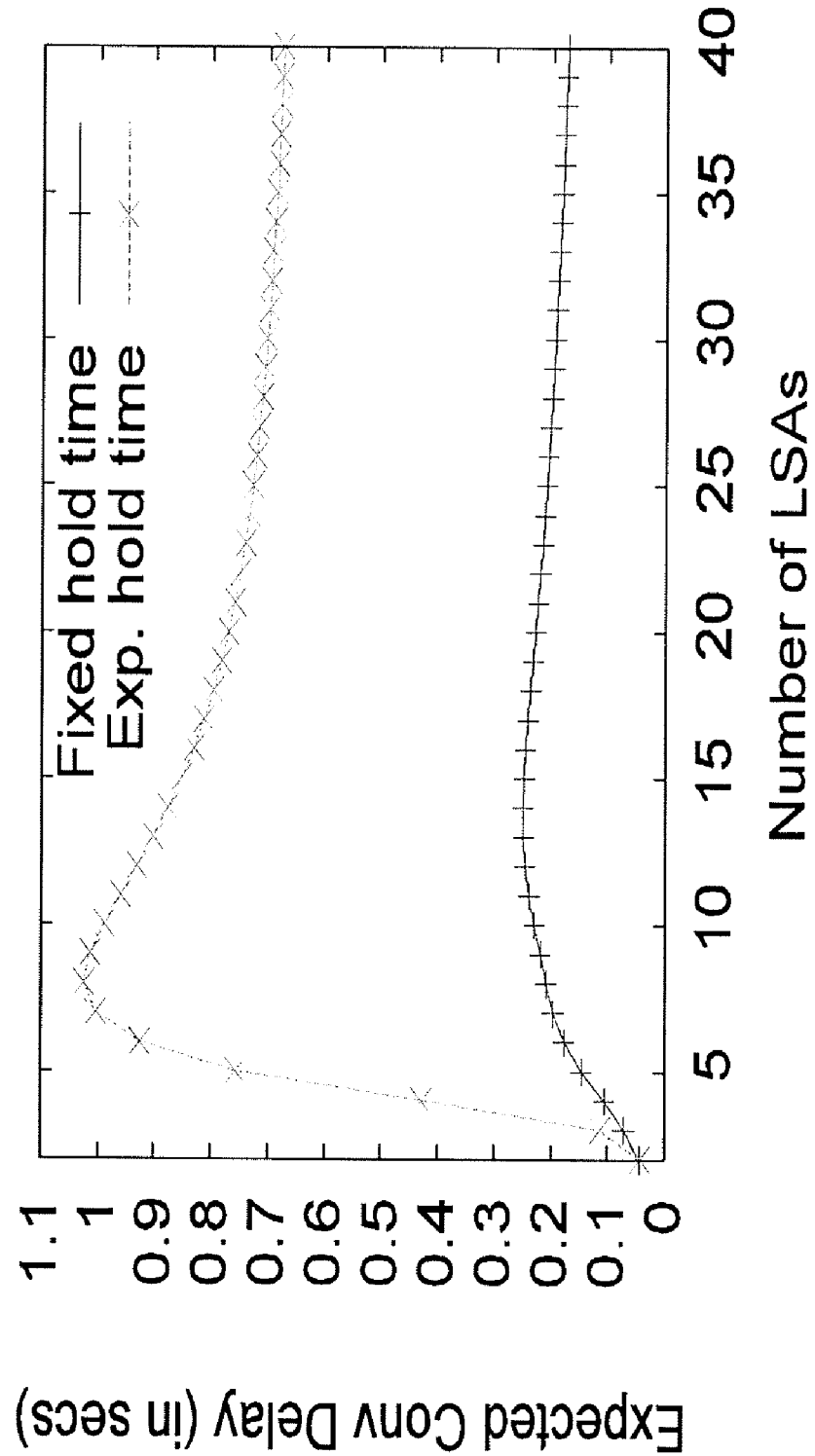
Figure 6A:
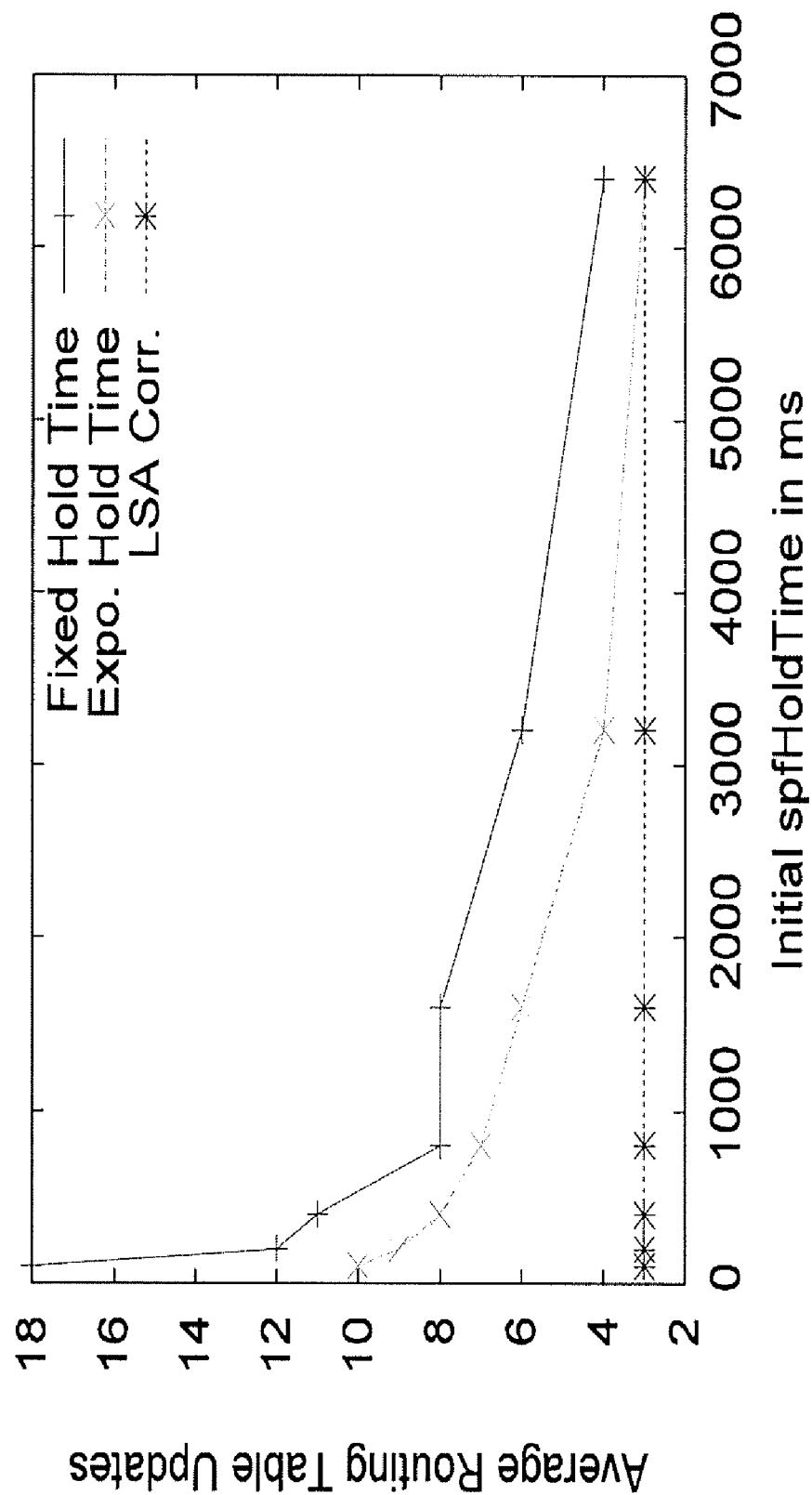
FIGS. 6(a)-(h) are a plurality of plots showing network up simulation results comparing performances of LSA Correlations and hold time based schemes.
Figure 6B:
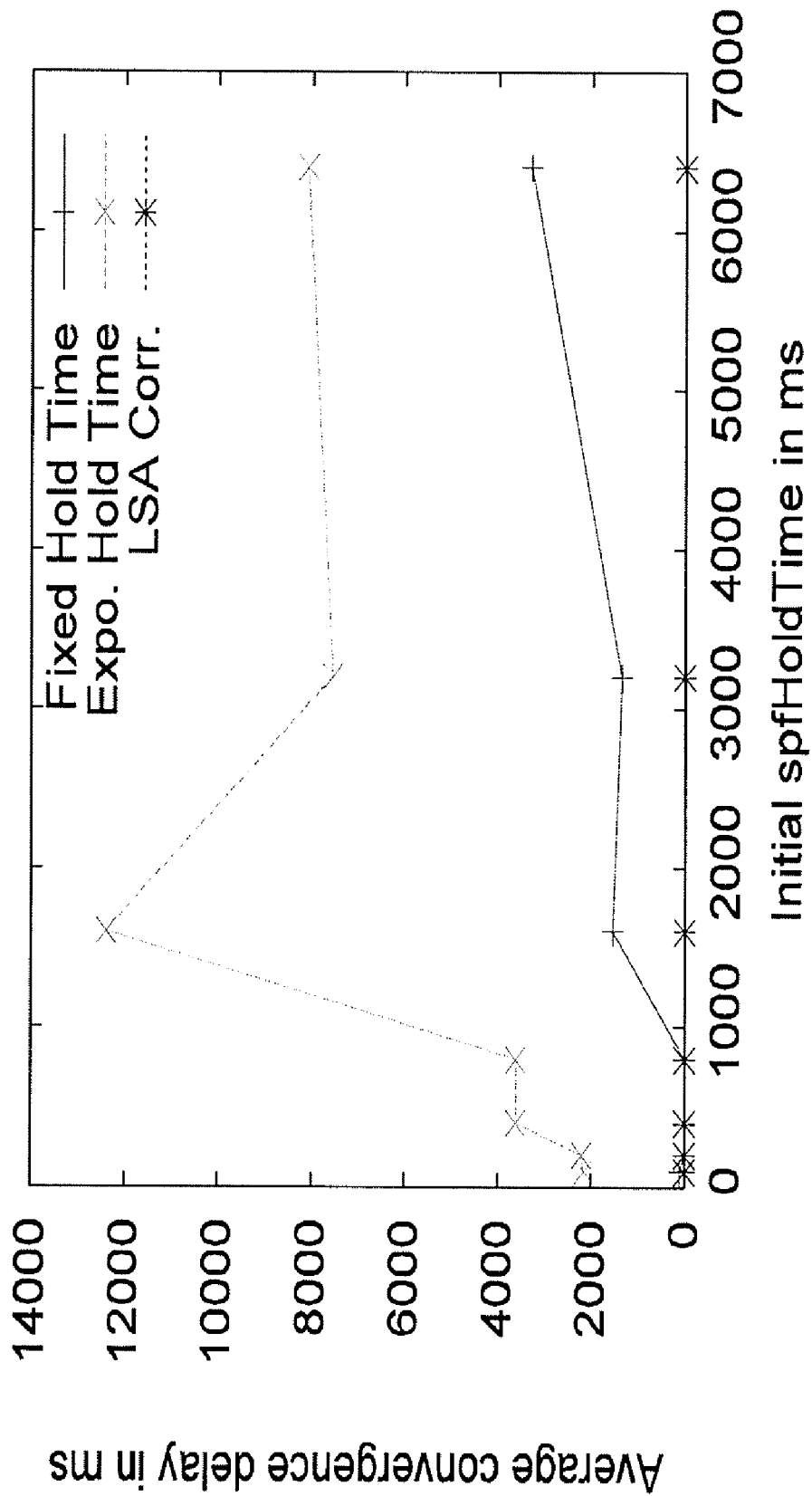
Figure 6C:
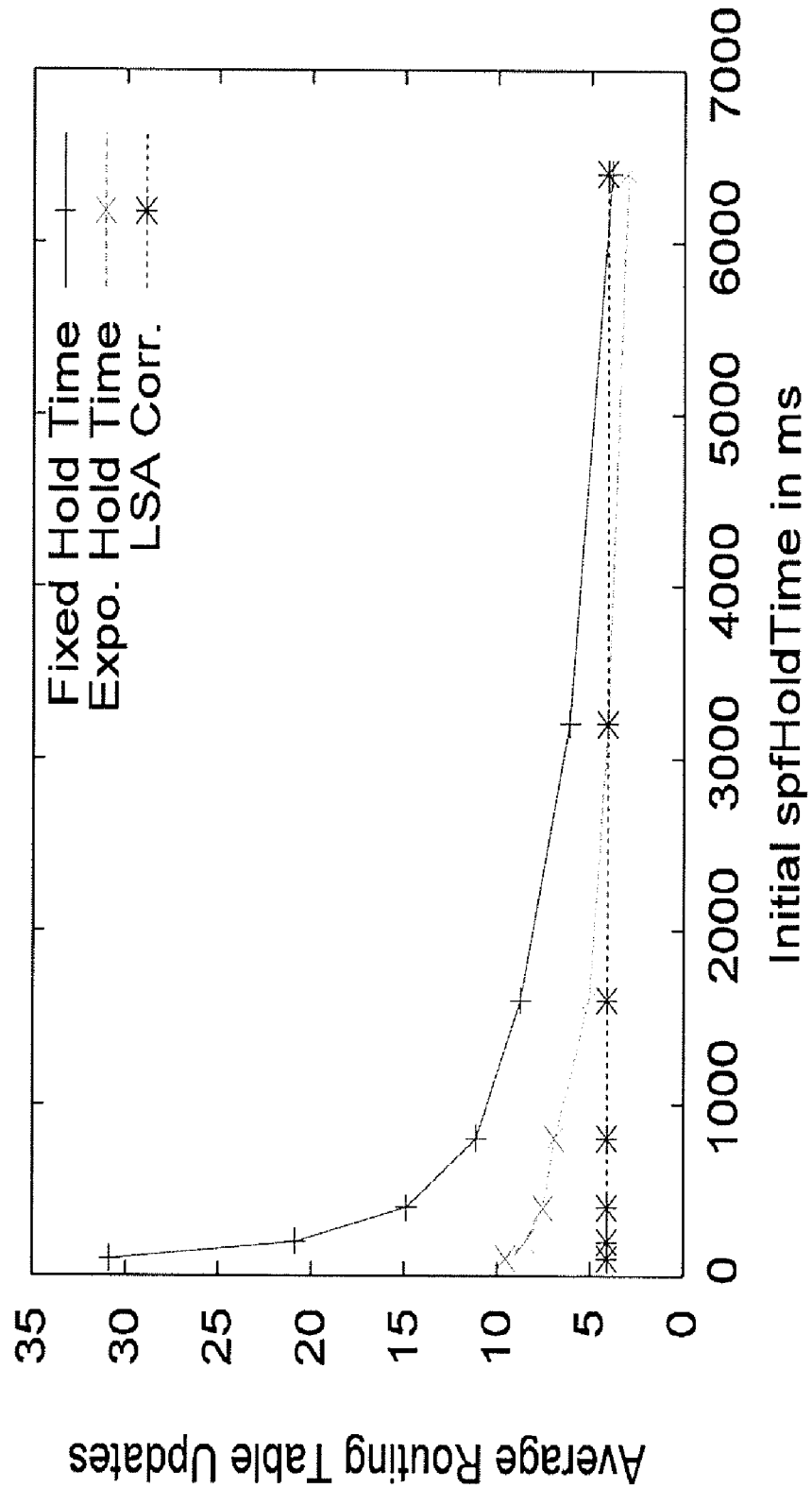
Figure 6D:
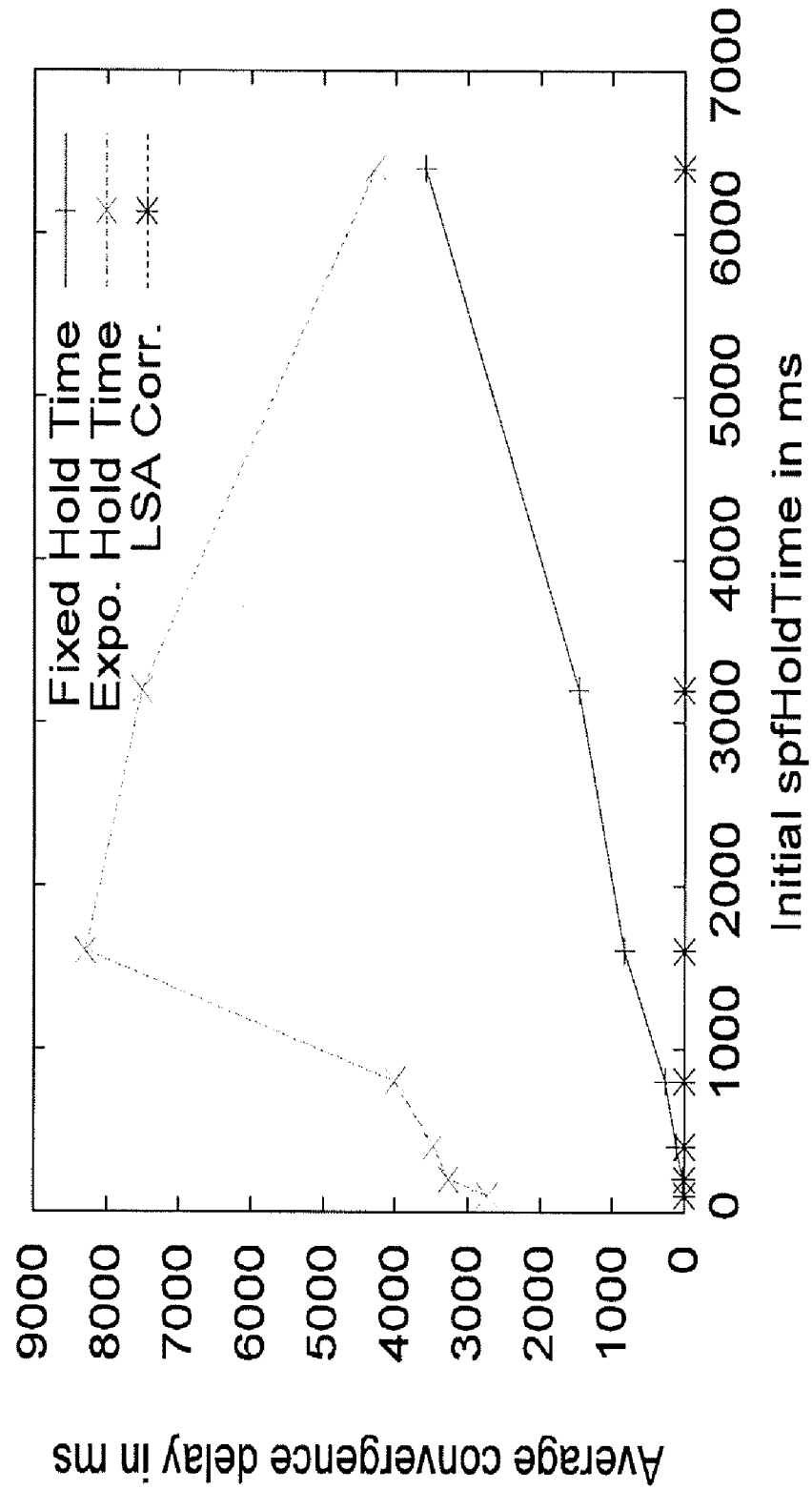
Figure 6E:
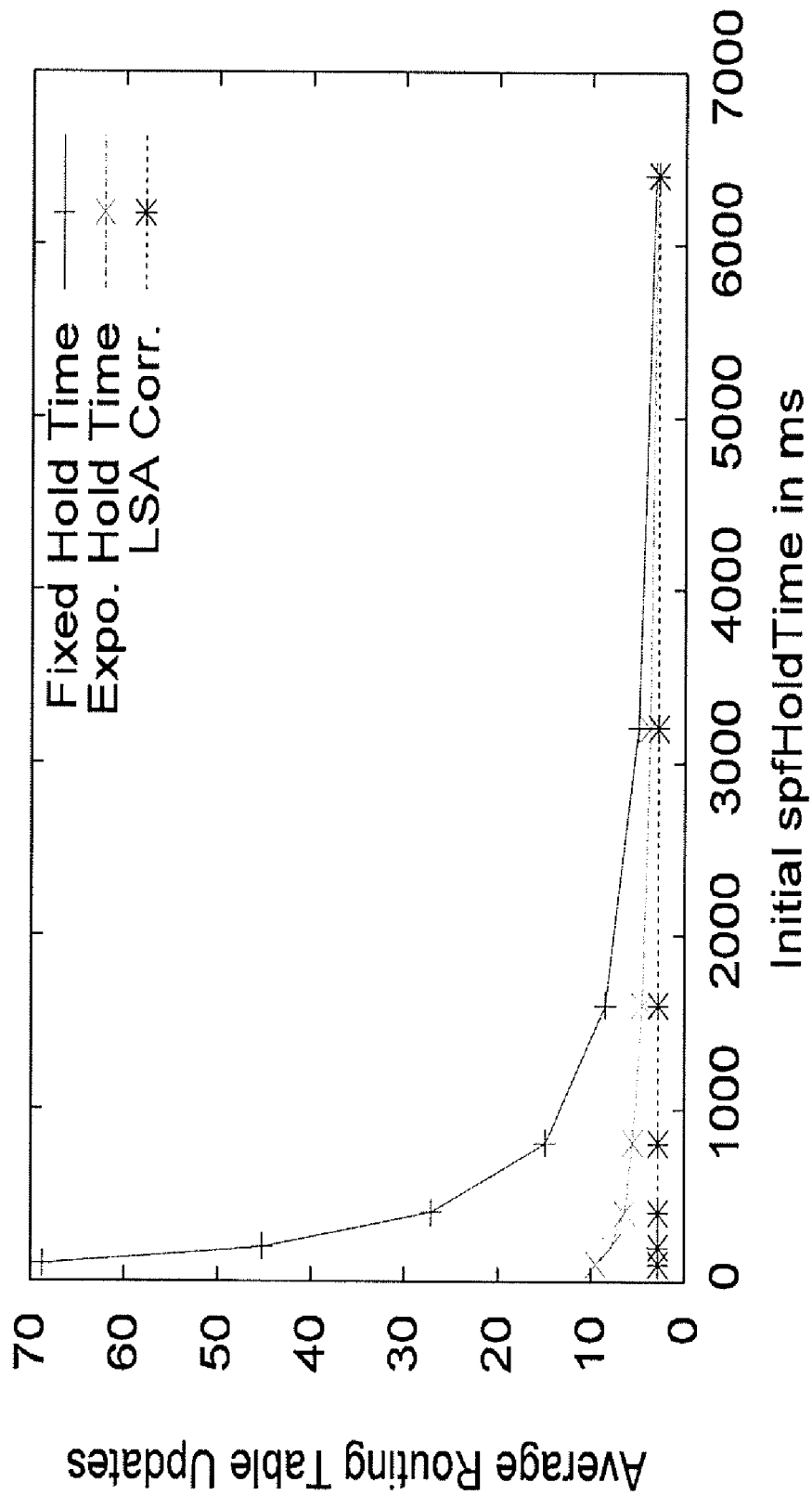
Figure 6F:
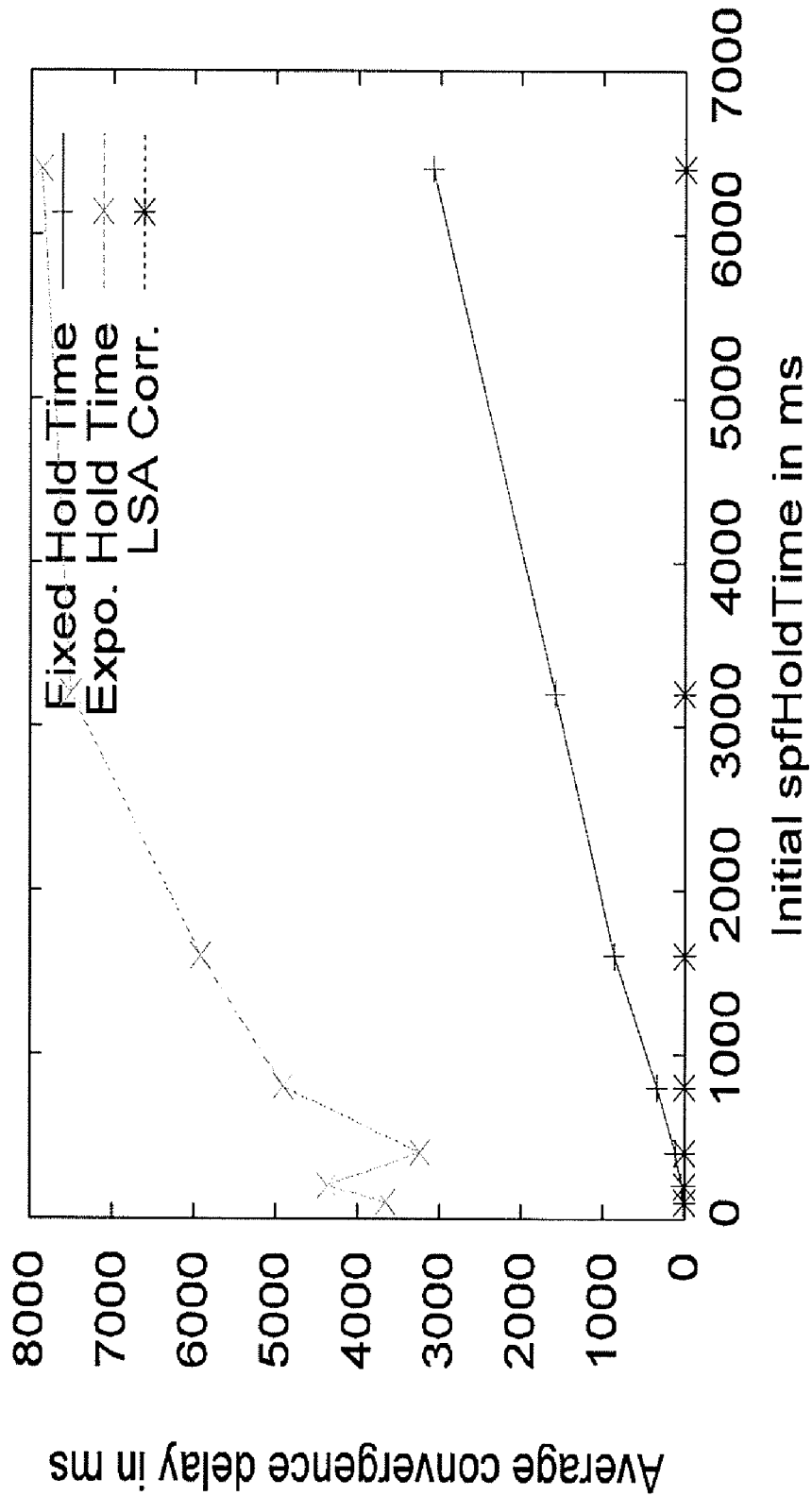
Figure 6G:
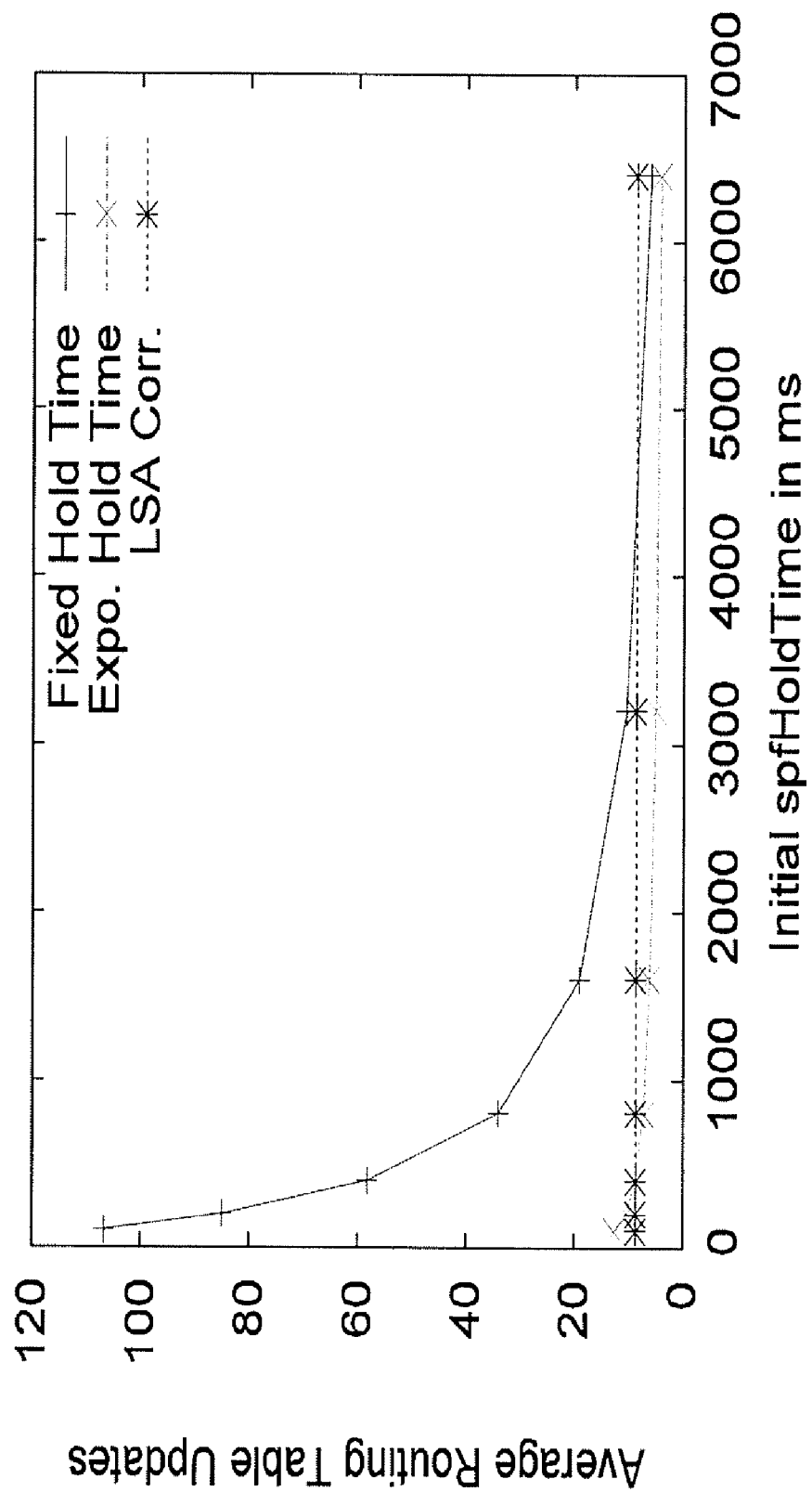
Figure 6H:
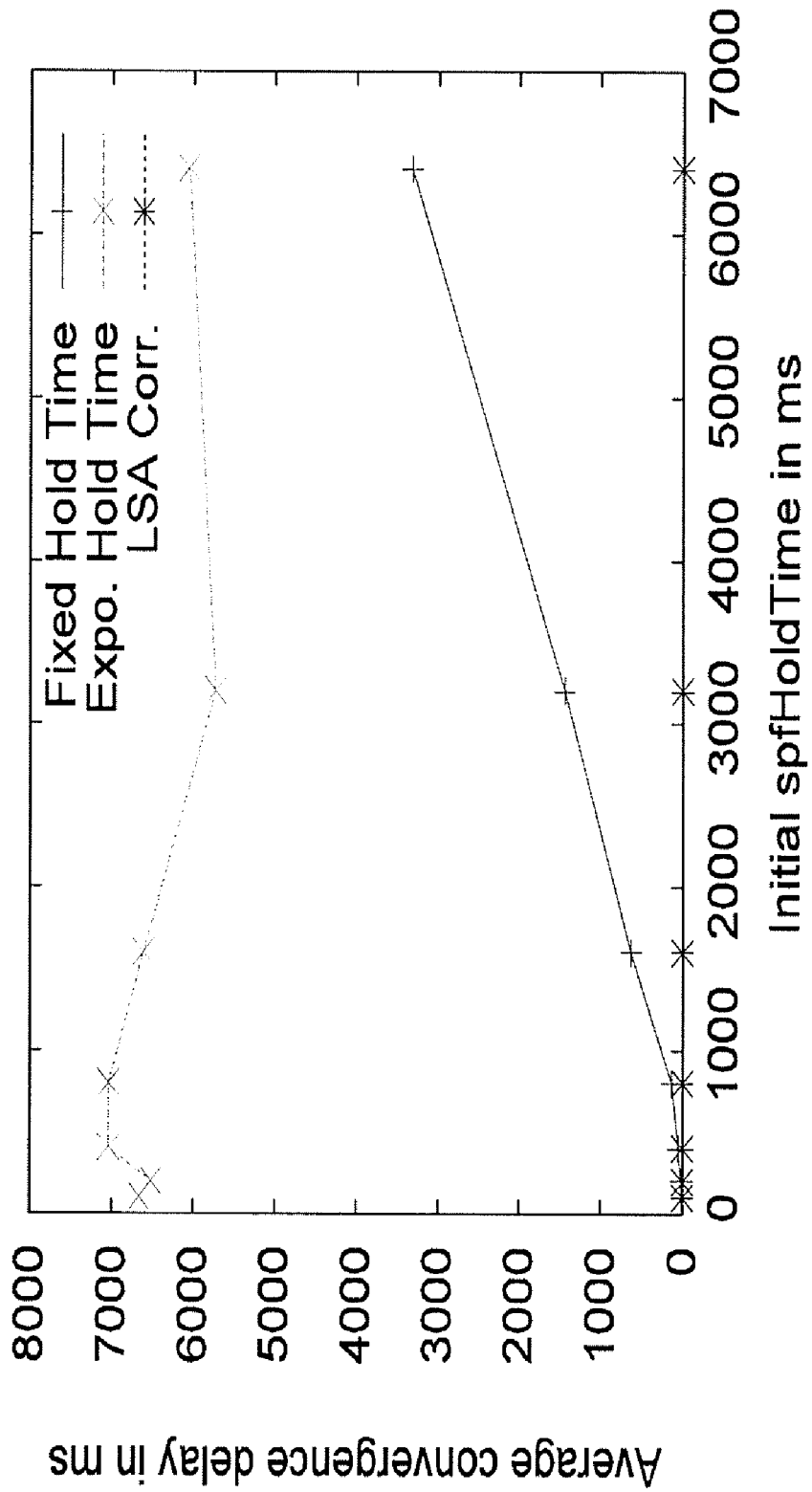

Impact of Number of LSAs (n): FIGS. 5(k) and 5(l) illustrate the impact of the number of LSAs generated due to the topology change(s) on the behavior of the fixed and exponential hold time schemes. The curves shown illustrate the case when LSAs arrive over about 3 seconds and the (initial) spfHoldTime is about 0.5 seconds with no upper limit on spfHoldTime. If only 2 or 3 LSAs are generated as the result of a topology change and these LSAs arrive over about 3 seconds, the arriving LSAs (except the first one) are likely to find the router in SPF HOLD OVER state 225. Thus, the expected number of routing table updates may be same as the number of LSAs and the expected convergence delay may be very small. As the number of LSAs increase, the LSAs are more likely to arrive while the router is in SPF state 215, thereby halting the linear increase in the expected number of routing table updates and causing non-negligible convergence delays. For exponential hold time scheme, the exponential backoff in spfHoldTime kicks in causing a steep increase in the expected convergence delay. As the number of LSAs increase further, it becomes almost certain that an LSA may be received while in SPF state 215. Thus, with given values for H and D, the fixed and exponential hold time schemes to result in 7 and 4 routing table updates are expected, respectively, with last routing table update taking place at times about 3.1 and about 3.6 respectively. Also, with increase in the number of LSAs, the expected arrival time of the last LSA moves closer and closer to about 3 seconds (the LSA arrival interval) and hence, the expected convergence delays can approach about 0.1 and about 0.6 seconds for the fixed and exponential hold time schemes respectively.

In the previous discussion, the impact of different parameters (I/D/H/n/T) on the performance of the hold time based schemes is analyzed. The LSA correlation scheme is not affected by these parameters. For isolated topology changes, the LSA correlation scheme requires one or two routing table updates with zero convergence delay (unless some LSAs generated due to the topology change do not arrive). As discussed earlier, a few optimizations are implemented to reduce the number of routing table updates required under LSA correlation scheme when large scale topology changes take place: a routing table update is performed only if no router is in the process of coming up; and topology changes identified based on the LSAs received during database exchange do not cause a routing table update.

LSA correlation scheme also provides a safety mechanism, the doSPF variable. This variable is set to true when a new LSA is received but no topology change is yet identified. A routing table update causes this variable to be reset. The doSPF variable is associate with a timer that starts when the variable is set to true. The firing of this timer causes a routing table update to take place, thereby assimilating all LSAs received so far into the routing table. The factors described above are expected to impact the performance of the LSA correlation scheme in case of large scale topology changes.

In the following, network up simulations are used to compare the performance of LSA correlation scheme with hold time based schemes under large scale topology changes. In these simulations, all the routers in the network are initially down and come up one by one at random times. Note that the number of routing table updates and the convergence delay (the delay between the receipt of last new LSA and the following routing table update) for each router in the network and present these numbers for a representative router under different schemes. These simulations were performed using a modified version of the ospfd simulator. The ospfd software is an opensource implementation of the OSPF protocol that can also run in a simulator mode. In the simulator mode, each OSPF router is represented by a separate process. The ospfd simulator is modified to allow distributed simulations, i.e. it is possible to run a single simulation on multiple machines connected over a network; to allow the topology changes to be specified in a simulation script; to associate time requirement with different OSPF tasks such as processing protocol packets, performing Dijkstra calculation and the like; and to implement LSA correlation and hold time based schemes.

The simulations, reported here, were performed using a real ISP backbone topology obtained from Rocketfuel website. It should be noted that other ISP backbone topology can also be used. This topology includes 79 routers and 147 bidirectional links. The spfDelay and initReturn Time values used in the simulations were about 0.1 seconds and max (current spfHoldTime, 10) seconds respectively. Seven different values (about 0.1, about 0.2, about 0.4, about 0.8, about 1.6, about 3.2, and about 6.4 seconds) are used for initial spfHoldTime and the upper limit on spfHoldTime is about 12.8 seconds. The Hello interval used by each router in these simulations is about 10 seconds. Also, each router observes the minLSInterval (about 5 seconds) delay before generating a new instance of its LSA. All the routers in the network belong to the same OSPF area. Each router takes about 1 ms to process an OSPF packet and the time required to perform a routing table update is about 10 ms. Thus, the cases where a routing table update may require several hundred milliseconds and frequent routing table updates may lead to instability has not been simulated. The purpose of our simulations is to understand the relative performance of LSA correlation and hold time based schemes in terms of convergence delay and the number of routing table update required for convergence.

Four different values (0 seconds, about 1 seconds, about 10 seconds, and about 60 seconds) are used for network up time, the time interval over which all the routers in the network come up. For each value (say x) of network up time (except 0 seconds), about 30 simulations are performed with about 30 different sets of router up times, uniformly distributed over x seconds with one router coming up at time 0. For each simulation, note the convergence delay and the routing table updates performed for each router and note down the average of these values for each router over about 30 simulation runs. The simulation results, as shown in FIGS. 6(a)-(h), illustrate these averages for a representative router.

In the following, the simulation results shown in FIGS. 6(a)-(h) are analyzed. First consider the results for the average number of routing table updates required. With a small value for spfHoldTime, the number of routing table updates required by the fixed hold time scheme increases rapidly with increase in the network up time. This is to be expected as a larger network up time means that individual router up events are further apart in time and the probability of receiving multiple LSAs during a spfHoldTime duration decreases. However, note that, the exponential hold time scheme does not result in too many routing table updates even with small values for initial spfHoldTime. This happens because the number of LSAs generated in a network reboot is so large that there is a good probability of receiving at least one LSA even in a small spfHoldTime. As the (initial) spfHoldTime increases, the routing table updates required under fixed and exponential hold time schemes come down rapidly. The LSA correlation scheme performs admirably in terms of the number of routing table updates required. Since the network topology includes 79 routers, a plain LSA correlation scheme may have required at least 79 routing table updates. However, the optimizations discussed before help reduce the number of routing table updates performed significantly. Notice that these optimizations do not affect the zero convergence delay property of LSA correlation scheme. Still, with large values for (initial) spfHoldTime, the hold time based schemes require some what fewer routing table updates than LSA correlation. Now, consider the results for the average convergence delay. As noted before, LSA correlation scheme results in zero convergence delay even after including the optimizations designed to reduce the routing table updates required in case of large scale topology changes. The expected convergence delays for the fixed and exponential hold time schemes follow familiar pattern with exponential hold time scheme causing much larger convergence delays than fixed hold time scheme.

Various features of the invention are set forth in the following claims.

The invention claimed is:

1. A method of recovering from a failure in a network of routers, the method comprising:
   receiving link state advertisements ("LSAs") from a plurality of routers affected by the failure;
   determining previous instances of the received LSAs;
   iterating through contents of the received LSAs and the previous instances;
   identifying a plurality of subevents based on the iteration;
   correlating the subevents to identify the failure; and
   scheduling an update in a routing table in response to identifying the failure.

2. The method of claim 1, wherein correlating subevents comprises starting a timer and ceasing the correlating act based on the timer timing a period, and the method further comprising:
   scheduling an update in the routing table if the timer traverses the period and the failure has not yet been identified.

3. A network failure recovery system for a plurality of routers, the system comprising:
   a memory configured to store a previous instance of link state advertisement ("LSA") of the routers;
   a module configured to receive at least one LSA from the routers;
   an iteration module configured to compare contents of the stored LSA and the received LSA;
   an identifying module configured to identify a plurality of subevents based on the iteration;
   a correlating module configured to correlate the identified subevents; and
   a scheduler configured to schedule an update in a routing table based on the correlated subevents.

4. The system of claim 3, wherein each of the subevents comprises a link down event, a link up event, a router down event, a router up event, a shared risk link group down event, and a point-of-presence down event.

5. The system of claim 3, wherein the identifying module is further configured to determine an adjacency status from the received LSA.

6. The system of claim 3, wherein the correlating module is further configured to identify a change of topology, the system further comprising:
   a timing module configured to be started when a failure occurs; and
   a routing table module configured to determine the routing table when the change of topology remains unidentified and after the timing module has fired.

7. The system of claim 6, wherein the failure comprises at least one of a node failure, a shared risk link group failure, and a point-of-presence failure.

8. A method of identifying a topology change of a network, the method comprising:
   a first router receiving link state advertisements from a plurality of other routers affected by the topology change;
   the first router comparing the received link state advertisements with prior link state advertisement instances to identify a plurality of changes;
   the first router correlating the plurality of changes to identify the topology change; and
   the first router scheduling a routing table update in response to identifying the topology change and not to each received link state advertisement, thereby requiring less routing table updates.

9. The method of claim 8, wherein the topology change is identified from a group consisting of a link down event, a link up event, a router down event, a router up event, a shared risk link group down event, and a point-of-presence down event.

10. The method of claim 8, further comprising
   starting a timer when initiating the above mentioned process of identifying the topology change; and
   scheduling a routing table update when the timer fires if the topology change remains unidentified.

11. The method of claim 1, wherein the failure is identified from the group consisting of a link failure, a router failure, a shared risk link group failure, and a point-of-presence failure.

12. The method of claim 1, wherein at least one of the plurality of subevents is a loss of adjacency between a router originating a link state advertisement and a neighbor router.

13. The method of claim 1, wherein the correlating the subevents includes identifying a link failure when a router at either end of a link indicates loss of adjacency with a router at the other end.

14. The method of claim 1, wherein correlating the subevents includes identifying a router failure when all neighbor routers listed as adjacent in the last LSA from a failed router have indicated the loss of adjacency with the failed router.

15. The method of claim 1, wherein correlating the subevents includes identifying a shared risk link group failure when all links that belong to the shared risk link group have been identified to have failed.

16. The method of claim 1, wherein the plurality of routers includes a first plurality of routers and a second plurality of routers, wherein correlating the subevents includes identifying a point-of-presence failure when all links connecting a first plurality of routers in a point-of-presence to a second plurality of routers outside the point-of-presence have been identified to have failed.

* * * * *